United States Patent
Perri de Resende

(12)
(10) Patent No.: US 6,643,626 B1
(45) Date of Patent: Nov. 4, 2003

(54) SALES POINT BUSINESS METHOD AND APPARATUS

(75) Inventor: Otávio Márcio Perri de Resende, Av. Uruguai 620, Suite 507, Bairro Sion, Belo Horizonte/MG (BR)

(73) Assignee: Otavio Marcio Perri de Resende (BR)

( * ) Notice: Subject to any disclaimer, the term of this patent is extended or adjusted under 35 U.S.C. 154(b) by 0 days.

(21) Appl. No.: 09/430,151

(22) Filed: Oct. 29, 1999

(30) Foreign Application Priority Data

Nov. 24, 1998 (BR) ............................................. 9806357
Mar. 8, 1999 (BR) ......................................... DI5900364
Jul. 27, 1999 (BR) ....................................... C1.9806357

(51) Int. Cl.[7] ............................................. G06F 17/60
(52) U.S. Cl. .............................. 705/64; 705/16; 705/18
(58) Field of Search ................................ 312/114, 139, 312/204, 214, 242; 340/547, 5.3, 5.64, 5.73, 545.6, 545, 825.31, 825.34; 235/380, 375, 383, 381; 70/264, 78, 441; 186/52, 54; 705/1, 16, 18, 64, 23, 26 D; 700/236, 231, 237

(56) References Cited

U.S. PATENT DOCUMENTS

| | | | |
|---|---|---|---|
| 3,741,619 A | | 6/1973 | Dyer et al. |
| 4,688,169 A | * | 8/1987 | Joshi ........................... 364/200 |
| 4,746,909 A | * | 5/1988 | Israel et al. .................. 340/568 |
| 5,057,677 A | * | 10/1991 | Bertagna et al. ............. 235/381 |
| 5,091,713 A | | 2/1992 | Horne et al. |
| 5,125,726 A | * | 6/1992 | Hahn et al. .................. 312/114 |
| 5,392,025 A | * | 2/1995 | Figh et al. ................... 340/545 |
| 5,727,162 A | * | 3/1998 | Nakamura ................... 395/225 |
| 5,920,270 A | * | 7/1999 | Peterson ................. 340/825.37 |
| 6,108,588 A | * | 8/2000 | McGrady ..................... 700/231 |
| 6,112,502 A | * | 9/2000 | Frederick et al. ............. 53/411 |

FOREIGN PATENT DOCUMENTS

FR 2 650 099 1/1991
JP 410255123 A * 9/1998

OTHER PUBLICATIONS

McGeorge Gram; Neidlinger Donald; Sep. 14, 1994.*

* cited by examiner

*Primary Examiner*—Pierre E. Elisca
(74) *Attorney, Agent, or Firm*—Smith, Gambrell & Russell

(57) ABSTRACT

A preferred embodiment of the business method includes providing a sales point, with the sales point being configured to display merchandise. The sales point is remotely monitored to ensure use by an authorized agent, and also may be monitored for compiling information on transactions occurring at the sales point. Additionally, the sales point preferably incorporates one or more security alarms which may be remotely monitored. Preferably, the sales point incorporates the use of a display case which may incorporate a computer readable medium for operating various aspects of the display case.

16 Claims, 20 Drawing Sheets

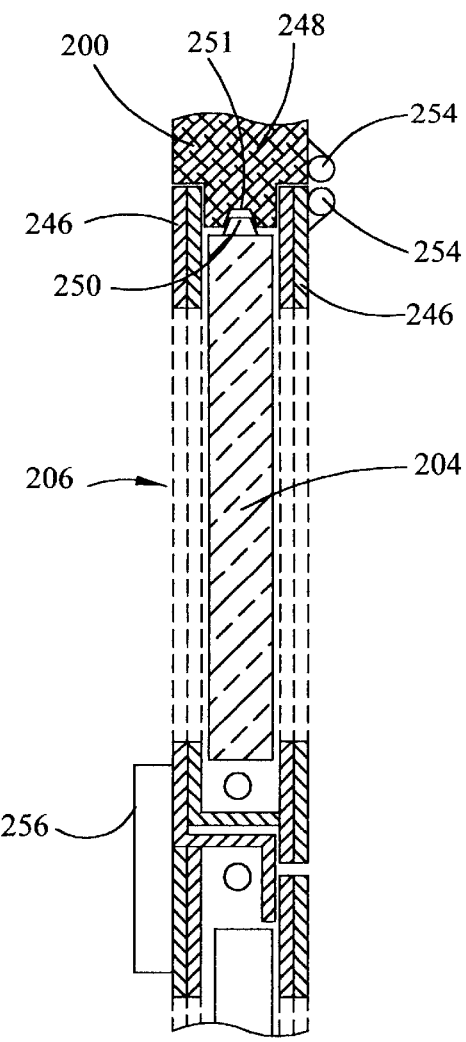
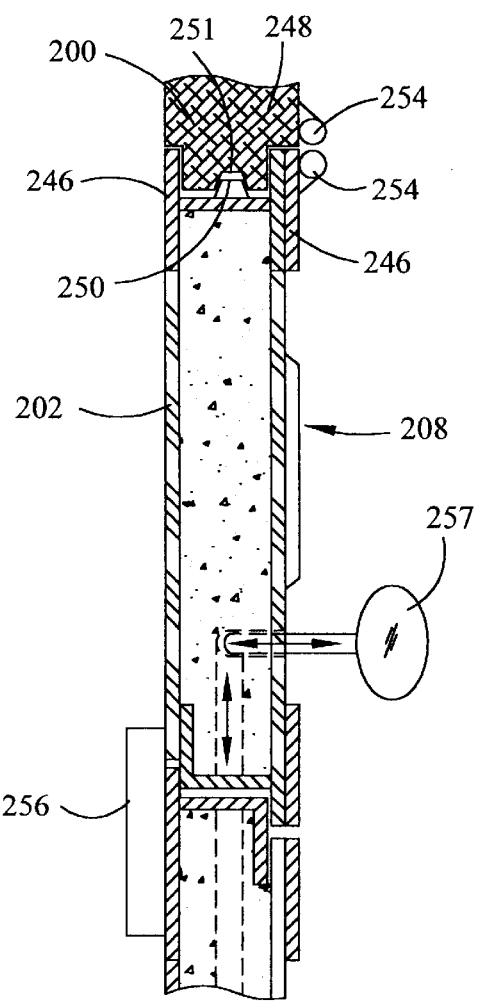
FIG. 14　　　FIG. 15
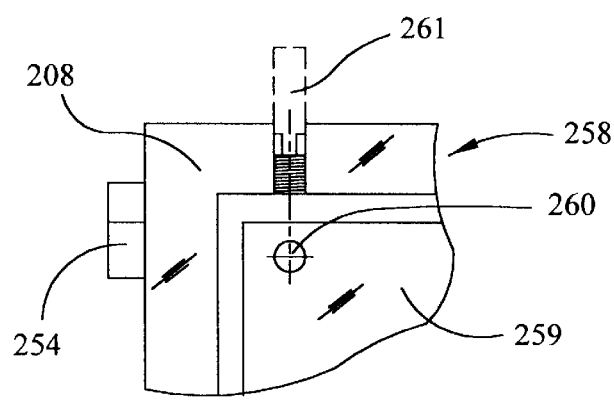
FIG. 16

SALES POINT BUSINESS METHOD AND APPARATUS

CROSS REFERENCE TO RELATED APPLICATIONS

This Application is based on and claims priority to Brazilian Patent Applications, Serial Nos. PI9806357-0, DI5900364-2, and C1.9806357-0, filed on Nov. 24, 1998, Mar. 8, 1999, and Jul. 27, 1999, respectively.

BACKGROUND OF THE INVENTION

1. Field of the Invention

The present invention generally relates to the field of merchandise sales and, in particular, to business methods and devices for the sale of merchandise.

2. Description of the Related Art

It is well known that the sale of merchandise, such as jewelry and other items of value, typically are sold in either specialty stores, such as jewelry stores, for instance, or other stores which typically are equipped with special safety devices for safeguarding the merchandise. Oftentimes, such stores typically possess a sophisticated and elegant appearance that tends to attract a certain type of customer, i.e., a customer with relatively large purchasing power. Such an appearance, however, also may inhibit the attraction of other customers, i.e., customers with average purchasing power. Due to the current stability in the value of gold and precious stones, the aforementioned "average purchasing power" customer may possess the ability to purchase merchandise, such as jewelry, and other "high-end" merchandise; however, as mentioned hereinbefore, the tendency of such customers to avoid jewelry stores and the like has, heretofore, tended to limit the sale of such merchandise.

While the "traditional" jewelry store method of merchandising arguably has some beneficial results, such as by providing increased security of the displayed merchandise, this method also tends to negatively affect the sale of less expensive and, thus more customer-accessible merchandise that could easily be purchased by a larger group of customers. Because of this, customer-accessible merchandise typically has been purchased by customers at a rate which is less than the rate desired by the producers of such merchandise.

Therefore, there is a need for improved business methods, and devices for implementing such methods, that address these and other shortcomings of the prior art.

BRIEF SUMMARY OF THE INVENTION

Briefly stated, the present invention relates to business methods and devices for the sale of merchandise. In a preferred embodiment, the business method includes providing a sales point, with the sales point being configured to display merchandise. The sales point is remotely monitored to ensure use by an operating agent, and also may be monitored for compiling information on transactions occurring at the sales point. Additionally, the sales point preferably incorporates one or more security alarms which may be remotely monitored.

In accordance with an aspect of the present invention, a preferred business method may include the steps of updating an inventory of merchandise contained at the sales point and transporting additional merchandise to the sales point based upon the listing of daily inventory, when required.

In accordance with another aspect of the present invention, a preferred embodiment of a sales point may incorporate a sales point unit for use in displaying and storing merchandise. Preferably, the sales-point unit includes an armored display case incorporating a display compartment and a storage compartment. Preferably, both the display compartment and the storage compartment include one or more doors for providing access to the interiors of the respective compartments. Additionally, the armored display case includes a security system which preferably utilizes first and second code entry devices, with the first code entry device providing access to the second code entry device, i.e., a notebook computer, which is stored in the storage compartment, along with a cash box, credit card machine, invoice printer, etc. Preferably, the display compartment may be opened for sales operations throughout the day, as well as the moving part of the cash drawer and the doors of the storage compartment, which preferably are activated by the notebook.

In accordance with another aspect of the present invention, a preferred embodiment of a sales point unit includes means for securely storing and displaying merchandise, means for providing access to the merchandise stored and displayed within the sales point unit, and means for remotely monitoring transactions occurring at the sales point unit.

In accordance with another aspect of the present invention, a computer readable medium is provided for operating a sales point unit. Preferably, the computer readable medium includes a first code segment which provides access to the merchandise stored and displayed within the sales point unit, and a second code segment which provides monitoring of transactions occurring at the sales point unit such as through the notebook to the inventory/re-supply of the Control Center. In some embodiments, the first code segment may be configured to selectively provide access to the merchandise in response to receiving an access code within a defined time period.

Other features and advantages of the present invention will become apparent to one of reasonable skill in the art upon examination of the following drawings and detailed description. It is intended that all such additional objects, features, and advantages be included herein within the scope of the present invention, as defined by the claims.

BRIEF DESCRIPTION OF THE SEVERAL VIEWS OF THE DRAWINGS

The present invention will be more fully understood from the accompanying drawings of various embodiments of the invention which, however, should not be taken to limit the invention to the specific embodiments enumerated, but are for explanation and for better understanding only. Furthermore, the drawings are not necessarily to scale, emphasis instead being placed upon clearly illustrating the principles of the invention. In the drawings:

FIG. 14 is a partially cut-away, top view of the present invention showing detail of the display compartment door assembly.

FIG. 15 is a partially cut-away, top view of the present invention showing detail of the storage compartment door assembly.

FIG. 16 is a partially cut-away, front view of the door showing detail of a locking mechanism to be activated in the event of break-in.

FIG. 17 is a schematic diagram depicting a preferred embodiment of the locking mechanism of the storage compartment doors, and also a supplementary locking system to be activated in the event of break-in.

DETAILED DESCRIPTION OF THE PREFERRED EMBODIMENTS

Figure 1:
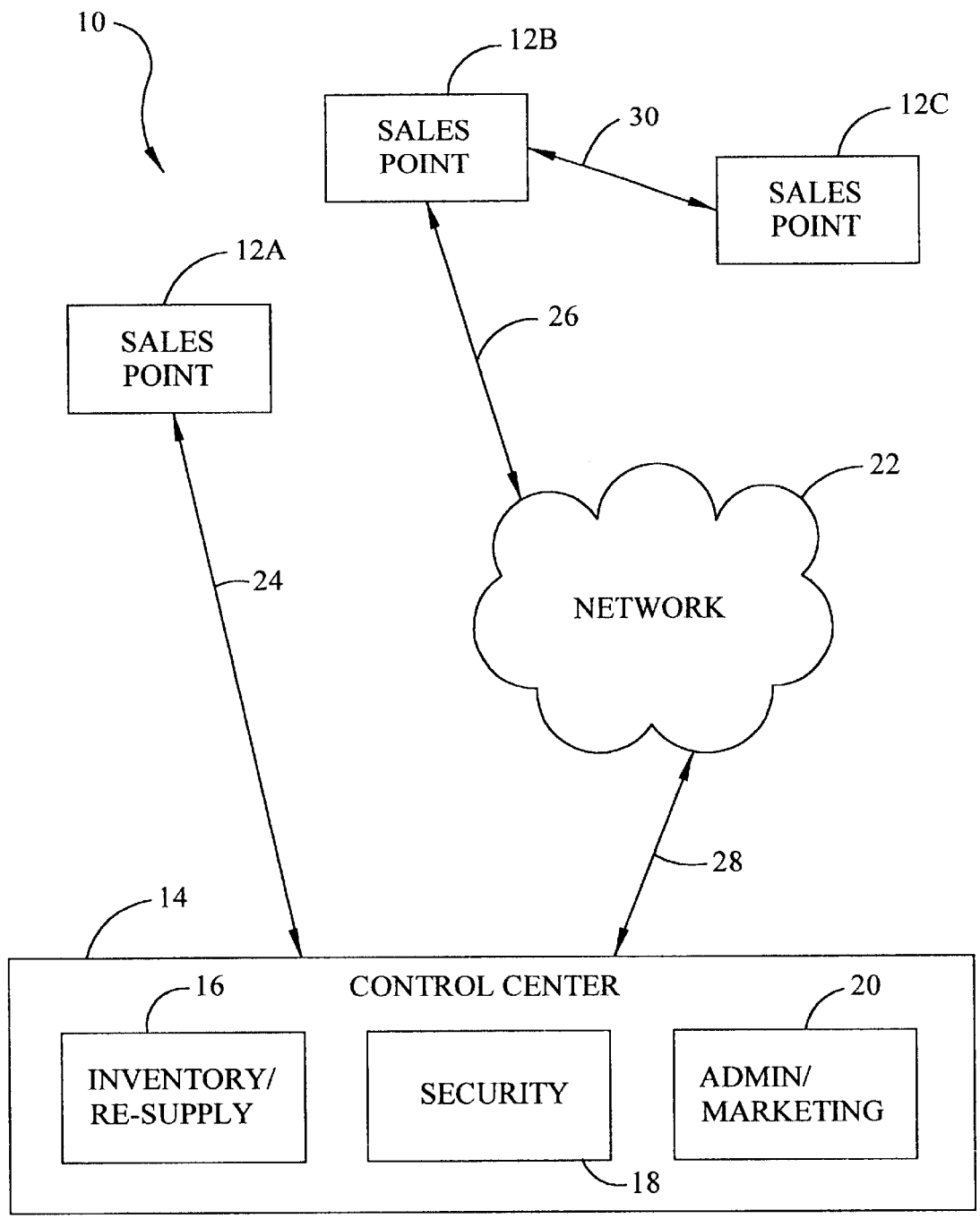
FIG. 1 is a high-level schematic diagram depicting a preferred embodiment of the business method of the present invention.

Reference will now be made in detail to the description of the invention as illustrated in the drawings, wherein like reference numbers indicate like parts throughout the several views. As shown in reference to the representative embodiments described hereinafter, the present invention avoids many of the potential inadequacies inherent in the prior art by providing a network of sales points which may be positioned at various locations. In a preferred embodiment, a practical system for selling and/or repairing merchandise, such as jewelry and watches, for example, is provided utilizing transportable sales points, i.e., armored showcases, for instance, that can be allocated to other trade points such as department stores, clothes stores for men and women, shoe stores, malls, airports, salons, perfumeries, spas, supermarkets, etc.

For example, the concept of selling jewelry and watches in non-jewelry store establishments offers the potential of providing, heretofore, unavailable levels of service and efficiency. By using a transportable armored showcase with advanced security devices, increased security may be provided for the sales point as well as for the establishment in which it is located. In this manner, a partnershp may be established between the owners of the sales points and the owners of the establishments. Through such partnerships, it may be possible to provide merchandise for the sales points that are tailored to correspond to the clientele of the establishments, such as: (1) classical products for ladies' classical fashion stores; (2) young products for young people's wear stores; and (3) children's products for children's wear stores, for example, thereby potentially increasing the consumption of merchandise.

This business methodology enables people in the same line of business to perform jointly in a much closer way than previously accomplished in the prior art. Through the use of trained operators and fast communication systems, the sales point method preferably enables each of the partners to evaluate the other's trends and needs. Through this close relationship, an increase in sales will potentially be enabled.

Another unique aspect of the present invention is the expansion of the sales point owner's exposure into other partner establishments, i.e., salons, spas, supermarkets, airports. In return, the sales point owner may offer a percentage share in profits for use of the physical space of the establishment partner.

Due to the above, as well as other, considerations, it is believed that the present invention will change considerably the concept of sales of merchanise, such as jewelry and watches, for instance, because it will become easy to manage groups or sectors of consumers within an establishment, such as, for example: (1) the classic consumer (ladies' classical fashion stores); (2) the modem consumer (passing fashion stores); (3) the male consumer (male fashion wear stores); and (4) the child consumer (children's wear store), among others. Due to the matching of the merchandise of the sales point with the establishment into which the sales point is placed, a better result in terms of sales values, with added security, will potentially be achieved.

As shown in the preferred embodiment of FIG. 1, the business, or sales point method 10, preferably incorporates the use of a control center 14 which is adapted to intercommunicate with the various sales points 12. Preferably, the control center 14 provides several functions, such as inventory control, security, and marketing, for example, with the various functions preferably being facilitated by various departments, such as an inventory/re-supply department 16, a security monitoring department 18, and an admin/marketing department 20. Preferably, the control center 14 intercommunicates with the various sales points 12 through the use of a network 22, such as an Internet, PSTN, Intranet, or other suitable communications network.

As depicted in FIG. 1, intercommunication between the control center 14 and the various sales points may be facilitated through the use of a direct communications link, such as link 24, utilized by sales point 12(A), for instance, or through the use of an indirect link. Such an indirect link or links may include, for example, communications links 26 and 28, which facilitate intercommunication of sales point 12(B) with the control center 14 via network 22, or link 30, which interconnects sales point 12(C) with sales points 12(B), so that information regarding sales point 12(C) may be relayed to the control center.

In a preferred embodiment, sales points 12 each incorporate the use of a sales point unit, described in detail hereinafter, and each also preferably includes a sales point representative or agent for conducting transactions at the sales point. Each sales point unit is configured to provide secure display and storage of merchandise and is adapted to be placed in various locations, such as shopping centers, supermarkets, book stores, salons, airports, etc., and potentially offers the operator thereof an increased merchandise profit potential. This is accomplished by providing a means for reaching a broader customer market, while utilizing a minimal amount of floor space for the display of merchandise.

Figure 2:
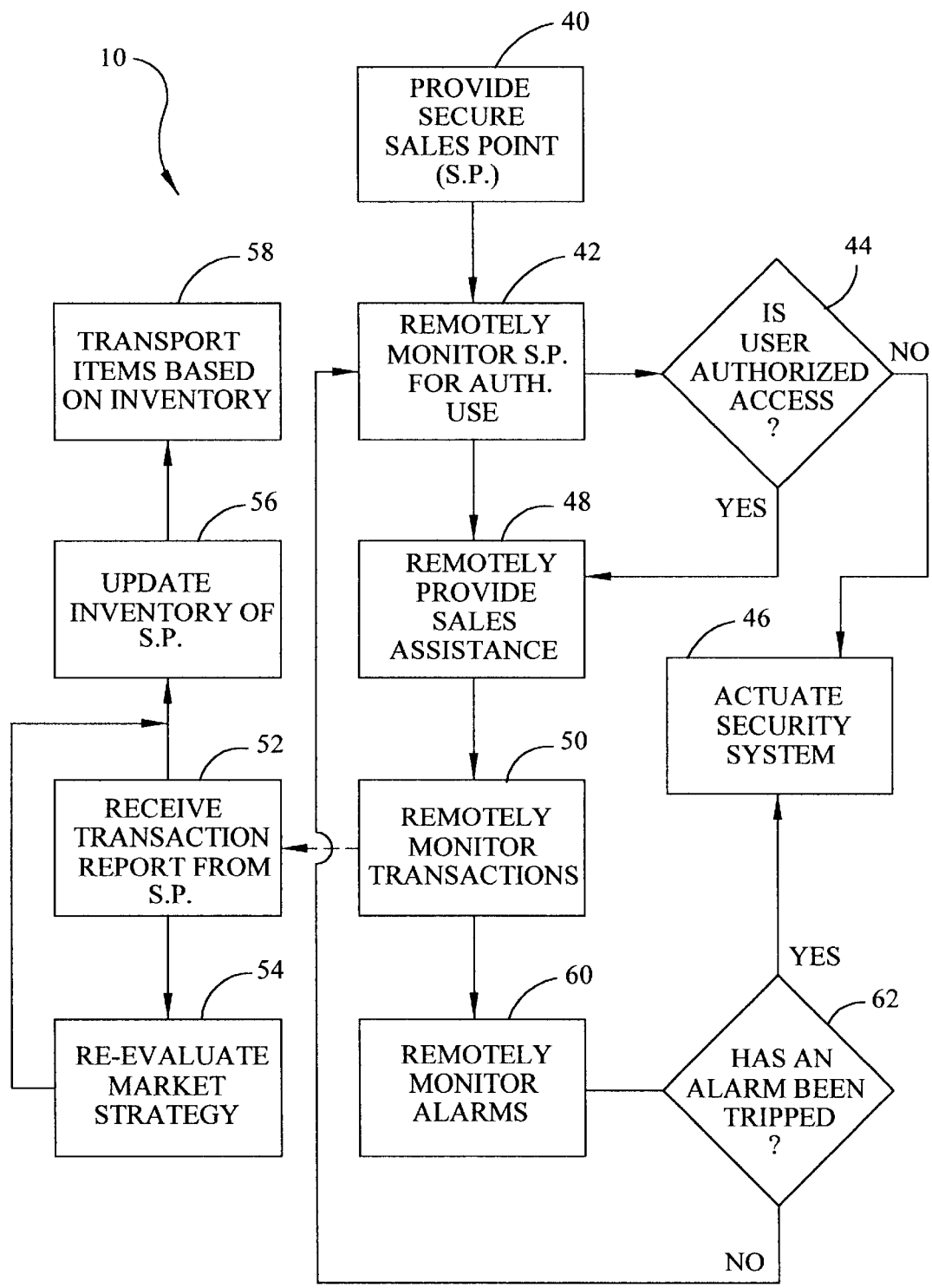
FIG. 2 is a flow diagram functionally demonstrating the steps performed by a preferred embodiment of the present invention.

Referring now to FIG. 2, a preferred embodiment of the sales point method 10 of the present invention preferably includes the step of providing one or more secure sales points, as depicted in block 40. Once such sales points have been provided, each of the sales points preferably are remotely monitored for authorized use, such as depicted in block 42. Such monitoring typically is provided by the security department of a control center, such as control center 14 (FIG. 1), with a query typically being made by the control center, as depicted in block 44, as to whether a person attempting to access the sales point is authorized to have such access. If it is determined that access is not authorized, either because the time is wrong, or because the operator is not authorized, for instance, the method may proceed to block 46 where a security system preferably is actuated. Actuation of the security system may include, for instance, the actuation of both aural and visual alarms, the dispatching of security personnel to the sales point, etc. If, however, it is determined that the person (agent) attempting to access the sales point is authorized such access, the method may proceed to block 48, where the control center may remotely provide assistance, such as sales assistance from the admin/marketing department 20 (FIG. 1), for instance, to assist the agent in conducting transactions with customers. As depicted in block 50, such transactions may be remotely monitored, such as by the control center through the use of video imaging, for instance.

The remote monitoring of transactions also preferably includes receiving a transaction report from each of the various sales points 12, as depicted in block 52, which may include information regarding balance of sales at the end of the day, inventory, pricing, marketing, etc. Once received from the sales points 12, the transaction reports may be utilized by the control center for reevaluating market strategy, such as for improving sales, improving profit margins, etc. Such market strategies may, for instance, be developed by the admin/marketing department and may include recommendations regarding the repositioning of sales points, and/or the modification of merchandise inventories contained within each of the various sales points, among others. Additionally, sales point transactions reports, when utilized to update the inventory of a sales point, as depicted in block 56, may be utilized as a basis for merchandise delivery (block 58). The transport of merchandise based on inventory may include replenishing each sales point to a predetermined inventory of merchandise based upon sales of the individual sales points, as well as the delivery of merchandise to various locations, such as to a customer's home or office, for instance, when a sales point is utilized as a drop point to facilitate the repair of an item of merchandise, for example.

In addition to remotely monitoring transactions as depicted in block 50, the embodiment of the sales point business method 10 depicted in FIG. 2 also includes the step of remotely monitoring alarms (block 60), and may also include deactivating the sales point, when necessary. For instance, if it is determined that an alarm has been tripped, as depicted in block 62, the method preferably includes the step of actuating the security system, as previously discussed in regard to block 46. If, however, it is determined that no alarm has been tripped, the method may proceed back to block 42, for instance.

Figure 3:
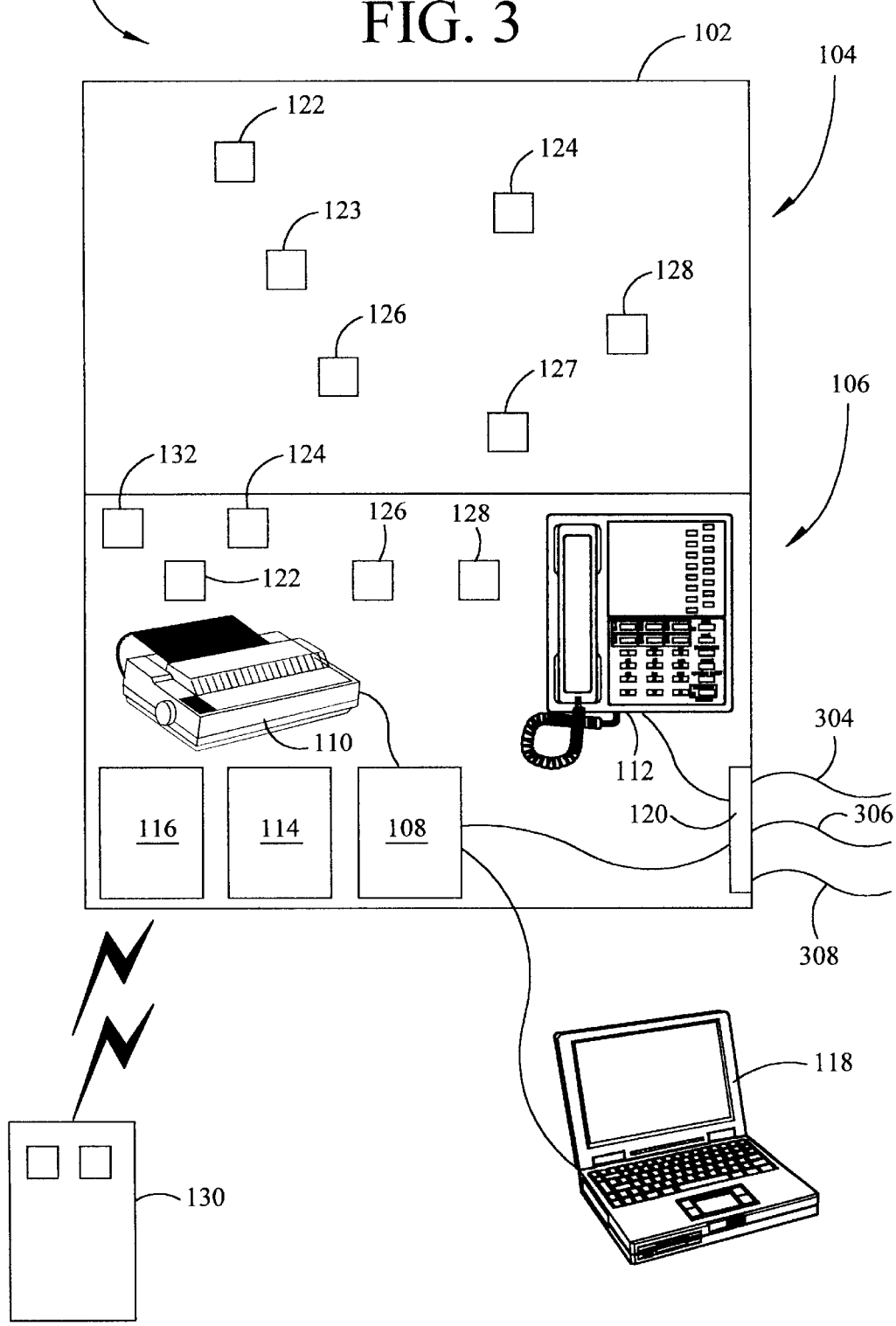
FIG. 3 is a schematic diagram depicting representative components of a preferred embodiment of the sales point unit of the present invention.

Referring now to FIG. 3, a schematic diagram of a preferred embodiment of a sales point unit 100 is presented. As described in detail hereinafter, such a unit 100 incorporates an armored display case 102 (sales point unit) which preferably includes a merchandise display area 104 and a storage area 106, with each of the areas 104 and 106 being specifically configured to prevent the theft of merchandise and/or other equipment stored within the display case. Preferably, each unit 100 incorporates multiple levels of security which are provided through the use of various construction techniques, sensors, security algorithms and security monitoring systems which, in combination, provide a level of security heretofore unavailable for storage with display and sale (merchandising) of merchandise, such as jewelry, for example.

As depicted in the representative embodiment of FIG. 3, the display case 102 preferably includes a storage area 106 which is configured to house various components. Examples of such components may include a computer 108, a printer 110, a telephone 112, such as a cordless telephone, a backup power supply 114, a safe 116, a notebook computer 118, switching assembly 120, which receives a telephone line 304 (preferably designated for normal use) telephone line 308 (preferably designated for emergency use), an electrical/power line 306, a chair (not shown), and various magnetic and vibration sensors 122, smoke sensors 123, panic buttons 124, voice recording modules 126, audio and video camera systems 127, and siren systems 128. Such apparatus 122–128 also may be allocated in the display area 104 and/or 106 of the assembly. Additionally, a remote access unit 130, which is the access key of the operator to the sales point, may be provided which communicates with an RF receiver 132, described in detail hereinafter.

Preferably, the sales point unit 100 incorporates the use of a sales point sub-system which facilitates interaction of the various components of the sales point unit 100 as well as facilitates integration of such a unit into the sales system business method 10 of the present invention. The sales point subsystem of the present invention can be implemented in hardware, software, firmware or a combination thereof. In a preferred embodiment, however, the sales point subsystem is implemented as a software package, which can be adapted to run on different platforms and operating systems as shall be described further herein and which is depicted in the block diagram of FIG. 3 as being run on a computer 108.

A preferred embodiment of the sales point subsystem 140, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer readable medium can be, for example, but not limited to, an electronic, magnetic, optical, electromagnetic, infrared, or semi-conductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 4:
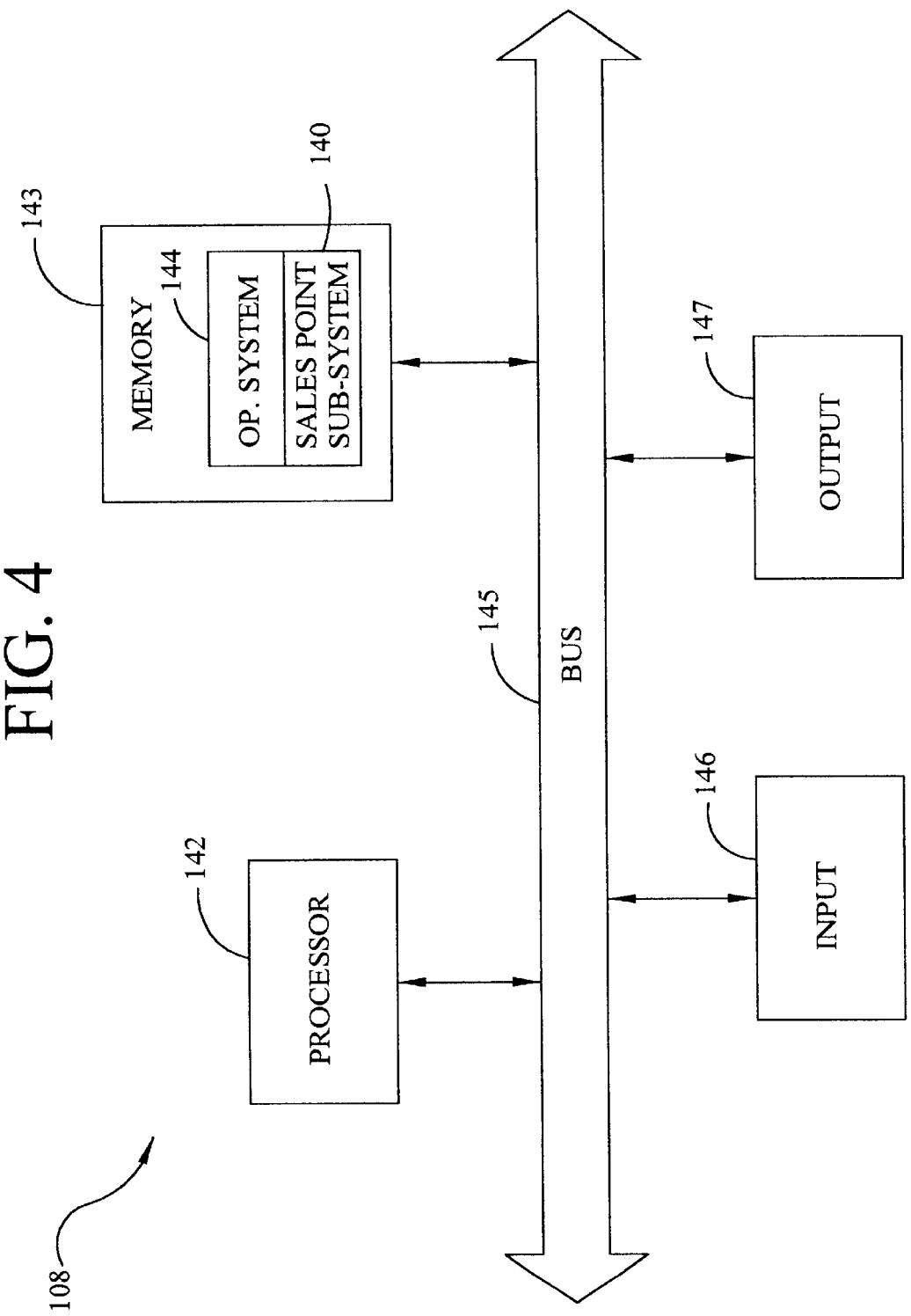
FIG. 4 is a block diagram illustrating a preferred operating environment for the sales point sub-system of the present invention.

FIG. 4 illustrates a typical computer or processor-based system 108 which may utilize the sales point subsystem of the invention. As shown in FIG. 4, computer 108 generally comprises a processor 142 and a memory 143 with an operating system 144. Herein, the memory 143 may be any combination of volatile and nonvolatile memory elements, such as random access memory or read only memory. The processor 142 accepts instructions and data from memory 143 over a local interface 145, such as a bus(es). The system also includes an input device(s) 146 and an output device(s) 147. Examples of input devices may include, but are not limited to a serial port, a scanner, or a local access network connection. Examples of output devices may include, but are not limited to, a video display, a Universal Serial Bus, or a printer port. Generally, this system may run any of a number of different platforms and operating systems, including, but not limited to, Windows NT™, Unix™, or Sun Solaris™ operating systems. The sales point subsystem of the present invention, the functions of which shall be described hereinafter, resides in memory 143 and is executed by the processor 142.

Figure 5:
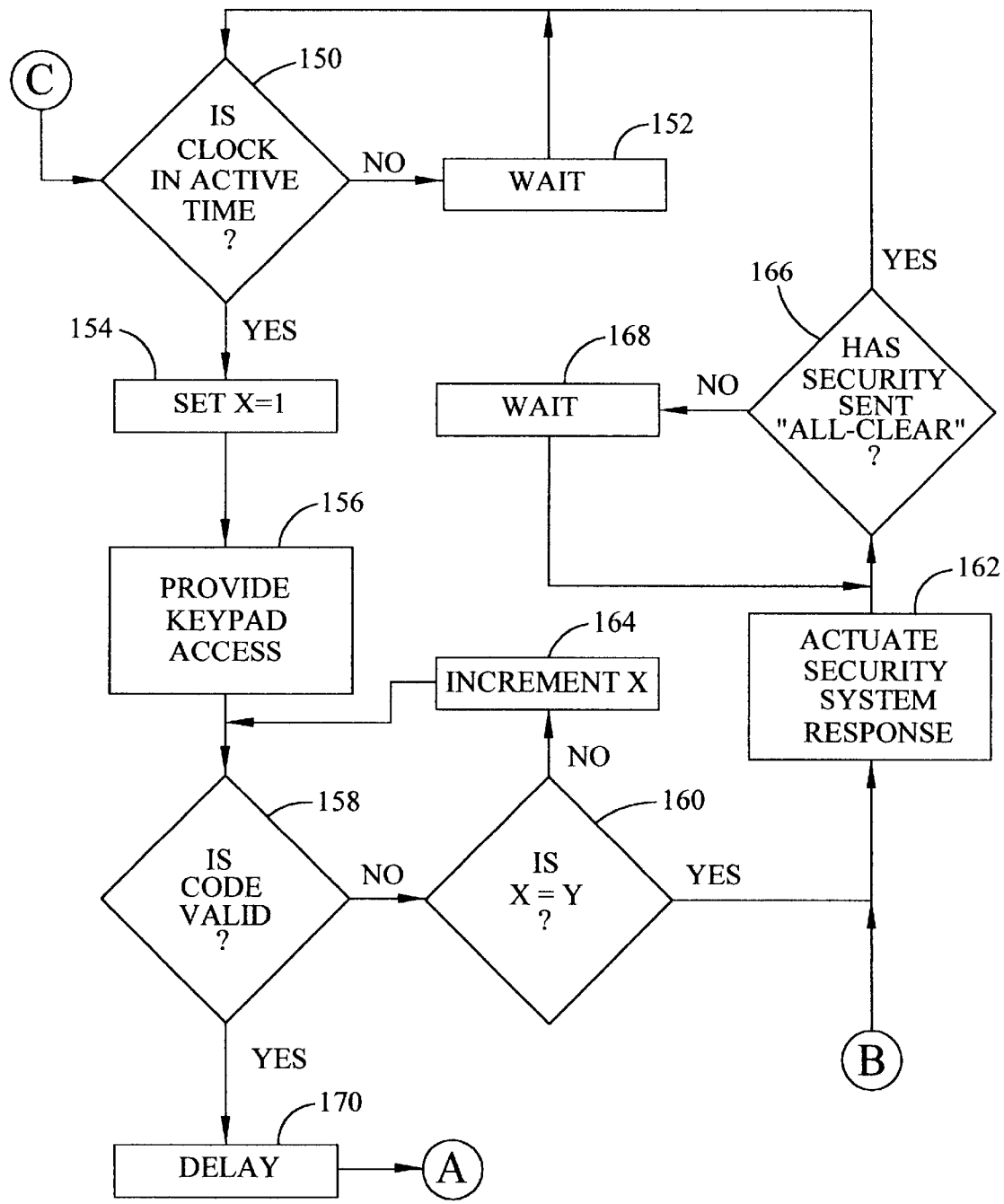
FIG. 5 is flow diagram functionally demonstrating the steps performed by a preferred embodiment of the present invention.

The flow chart of FIG. 5 shows the architecture, functionality, and operation of a preferred implementation of the sales point subsystem 140. In this regard, each block of the flow chart represents a modular segment or portion of code which comprises one or more executable instructions for implementing the specified logical function or functions. It should also be noted that in some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved.

In the embodiment depicted in FIG. 5, the sales point subsystem queries, as depicted in block 150, whether the sales point unit is in active time. Such active time may be based upon clock time, i.e., normal business hours, for instance. If it is determined that the clock is not within the prescribed active time period, the subsystem may proceed to block 152 where the subsystem waits until an affirmative determination is made. While waiting, access to merchandise and/or other equipment stored within the display case 102 (FIG. 3) is denied, thereby providing a measure of security for the merchandise and/or equipment. If it is determined, however, that an active time period is underway (for example, from 9 a.m. to 7 p.m.), the subsystem may proceed to block 154 where a counter variable "X" is set equal to one. The subsystem preferably then proceeds to block 156 where the operator is provided with access to a code entry device, such as a keypad, for instance. In preferred embodiments, access to the code entry device may be provided only after actuation of a remote access device (described hereinafter), for instance. The potential user of the sales point unit preferably must then enter a password or other code into the code entry device, such as depicted in block 156.

Once a password or other code has been entered, the subsystem determines whether the entered password is valid (block 158). If it is determined that the password is not valid, the subsystem may proceed to block 160 where a determination is made as to whether the counter variable, i.e., "X", is equal to a predetermined value, such as "Y". (The predetermined variable "Y" corresponds to the number of invalid password entries the system will allow a user to enter). For example, once a user has entered six invalid passwords, e.g., "Y" equals 6, the subsystem may proceed to block 162 where a security system response is actuated. If, however, it is determined that the counter variable "X" is less than the predetermined value "Y", the subsystem preferably proceeds to block 164 where the counter variable "X" is incremented, i.e., let x=x+1, and the user may then be given additional opportunities to enter a valid password, with the subsystem returning to block 158, for instance.

After a security system response has been actuated, such as in block 162, the subsystem preferably proceeds to block 166 where a determination is made as to whether security has sent an "all clear" signal. Such an "all clear" signal may include notifying security personnel that a security response is no longer necessitated, and/or may include resetting the various alarms and subsystems of the sales point unit so that normal use of the unit may take place. If such an "all clear" signal has been sent, the subsystem may proceed back to block 150, for instance, and then proceed as previously described. If, however, it is determined that an "all clear" signal has not been sent, the subsystem may proceed to block 168, where the system is prompted to wait until an "all clear" message is received.

Referring back to block 158, once a valid password has been received by the subsystem, the subsystem preferably proceeds to block 170, where the subsystem initiates a time delay. Such a time delay primarily is initiated for the purpose of conducting a security check of the user entering the valid password, therefore, any appropriate delay for facilitating such a check may be utilized. The predetermined time of fifteen-minutes, for example, gives security personnel a sufficient period of time to confirm the identification of users of all of the various sales point units that are being prompted for access at the beginning of a business day, for instance. Such a delay also may tend to inhibit theft of merchandise stored within a sales point display case, as the delay time occurring between the entry of a valid password and the time that access is provided to the contents of the display case may exceed the time period through which a potential thief may wait to gain such access.

Figure 6:
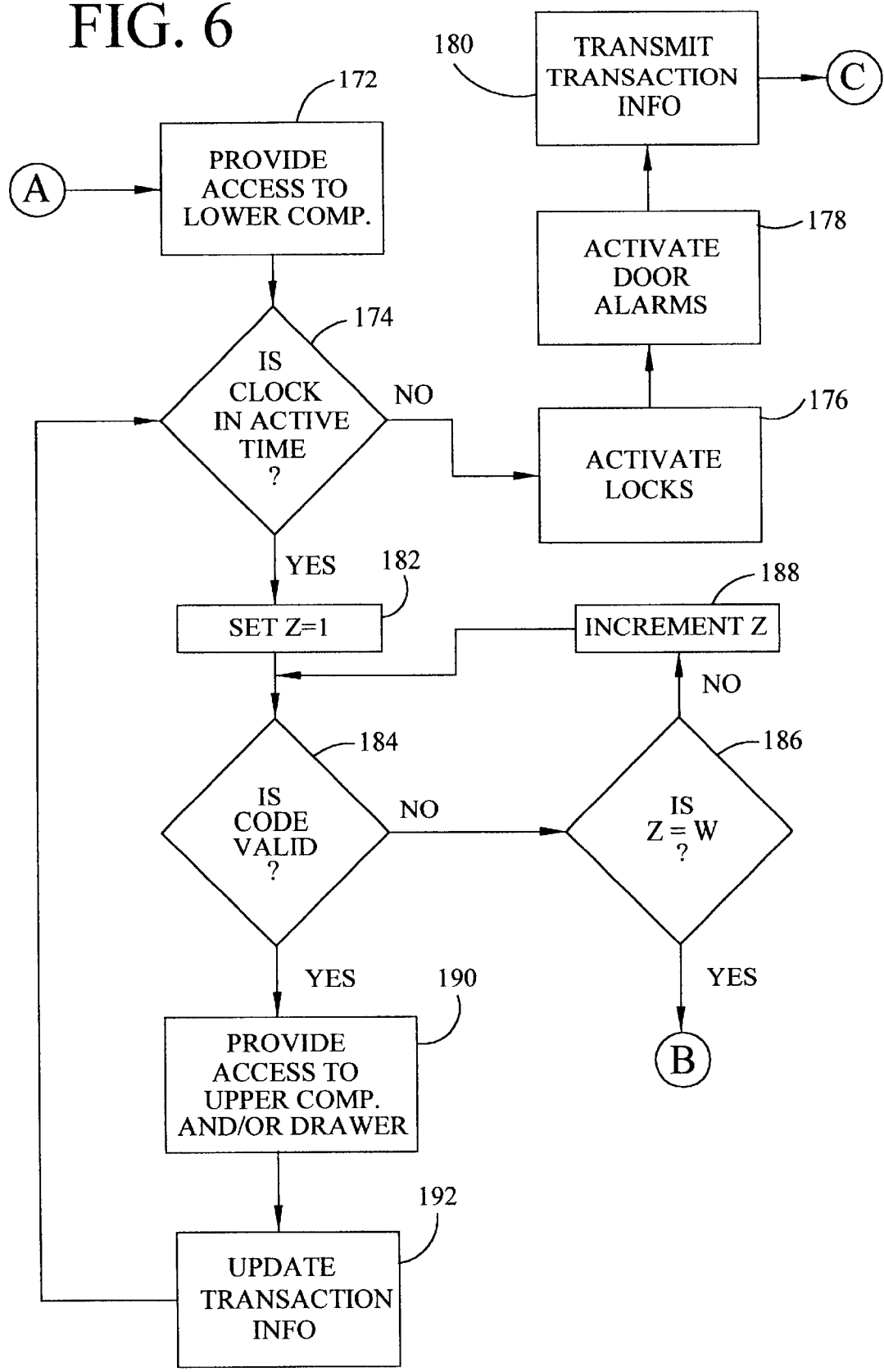
FIG. 6 is flow diagram functionally demonstrating the steps performed by a preferred embodiment of the present invention.

Referring now to FIG. 6, once the delay has occurred (block 170 of FIG. 5), the subsystem preferably proceeds to block 172 where access to the interior of the display case, such as to the storage compartment 106 (FIG. 3) of the case, is provided. Then, in block 174, a determination once again may be made as to whether the clock is in active time. If it is determined that the clock is not in active time, the subsystem may proceed to blocks 176, 178 and 180, for instance, so that any locks and door alarms of the sales point unit may be activated and information relating to any transactions occurring at the sales point, as described in detail hereinafter, may be transmitted back to the control center. Preferably, the subsystem then proceeds back to 150, as described hereinbefore.

Returning now to block 174, if it is determined that the clock is currently in active time, the subsystem may proceed to block 182 where a second counter variable, i.e., "Z", is set equal to "1". The second counter "Z" is set equal to "1" in anticipation of the user retrieving a second code entry device, such as a notebook computer, from the storage compartment of the display case and then configuring the second code entry device to communicate with the sales point subsystem. Once so configured, the user preferably must enter a second password or code which is then evaluated in block 184, for instance. If it is determined that the second password is not valid, the subsystem preferably proceeds to block 186 where a determination is made as to whether the second counter is equal to a predetermined variable "W". As previously described in relation to the predetermined variable "Y", the predetermined variable "W" is established so as to provide the user with a finite number of opportunities for entering a valid password into the second code entry device. If a determination is made in block 186 that the user has entered a number of invalid passwords equivalent to the variable "W", the subsystem preferably proceeds to block 162 (FIG. 5) where the security system response is actuated. If, however, it is determined that the user has not attempted to enter an invalid password more than the predetermined number of times, the subsystem preferably proceeds to block 188 where the second counter "Z" is incremented. The subsystem may then proceed back to block 184 where the user's password is once again evaluated.

Upon entry of a valid password within the predetermined number of attempts, the subsystem preferably instantaneously provides the user with access to other portions of the display case, such as the display compartment 104 (FIG. 3) and/or a cash drawer, such as depicted in block 190. At this point, the user (agent), now has access to the various compartments of the display case with access to the various compartments being controlled by the second code entry device or notebook, for instance. As such, the agent may conduct transactions, such as the sale of merchandise contained within the display compartment of the armored display case, the receiving for repair of items from customers (with the items preferably being stored within the storage compartment), etc.

Preferably, such transactions are entered into a database by means of the notebook. In some embodiments, the control center may be continuously updated with transaction information, as represented by block 192. In other embodiments, however, continuous updating of the transaction information does not occur. For instance, after block 190, the subsystem may proceed directly back to block 174 where a determination of the occurrence of active time is once again made. In an embodiment so configured, once it is determined that the occurrence of active time is no longer taking place, the subsystem may eventually proceed to block 180 where transaction information may be compiled and then transmitted back to the control center for use, as described hereinbefore.

Figure 7:
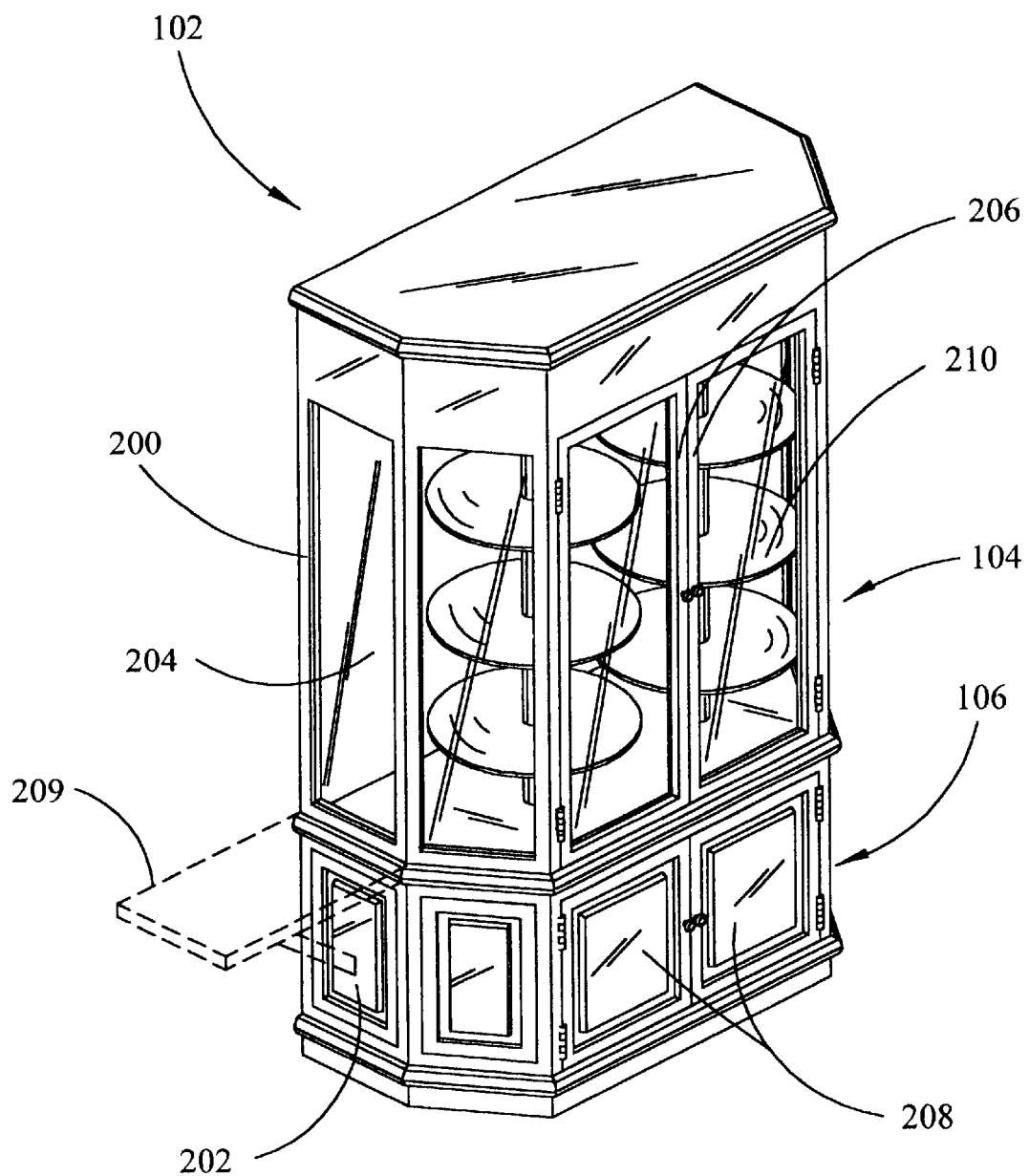
FIG. 7 is a perspective view of a preferred embodiment of the present invention.

Referring now to FIGS. 7–10, several embodiments of display cases 102 which are well suited for use with the sales point business method 10 of the present invention will be described in greater detail. As shown in FIG. 7, a preferred embodiment of the display case 102 is configured as a free-standing unit incorporating both a display compartment 104 and a storage compartment 106. Display case 102 preferably is constructed with a robust framework 200 formed of steel or other suitable material. Plates 202, preferably formed of steel sheet material, are disposed within the framework 200 to form storage compartment 106, while a combination of plates 202, bullet-proof glass 204, and/or polycarbonate cooperate with the framework to form the display compartment 104. Access to the interior of the display compartment and storage compartment is provided by doors, i.e., bullet-proof glassed doors 206 and armored doors 208, respectively.

As described briefly hereinbefore, storage compartment 106 is sufficiently sized and shaped for the storage of various items and equipment, such as a credit card machine, a cordless telephone 112, a computer 108, a safe 116, a notebook computer 118, an invoice printer 110, a back-up power supply 114, and various security apparatus 122–128, which will be described in detail hereinafter. Additionally, a support platform 209 may be provided for supporting a notebook computer, and/or cash box 290. The display compartment, however, is sized and shaped for the display of merchandise, such as jewelry, for instance, and may incorporate display platforms 210, such as in the form of revolving shelves, upon which the merchandise may be placed.

Figure 8:
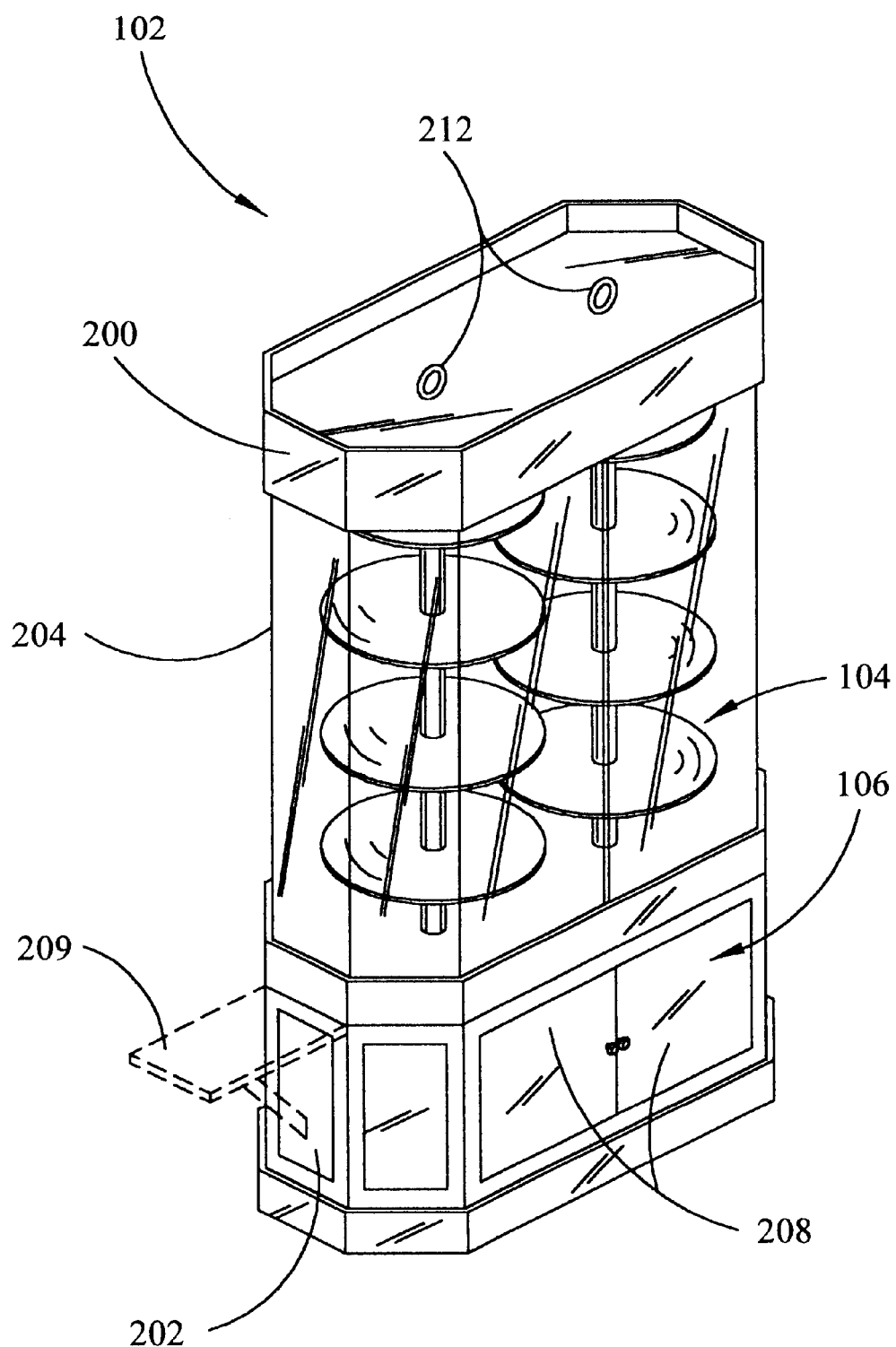
FIG. 8 is a perspective view of an alternative embodiment of the present invention.
Figure 9:
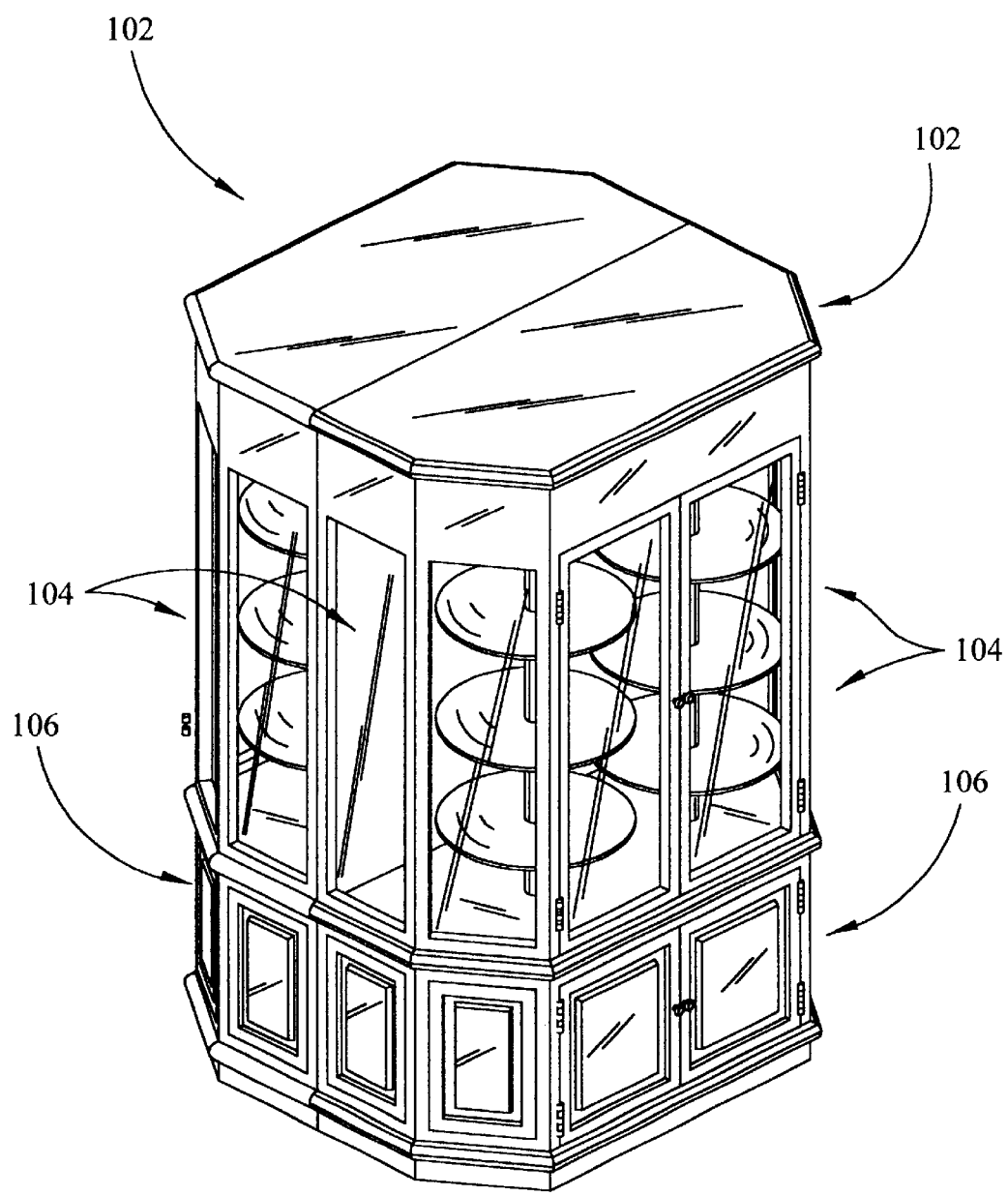
FIG. 9 is a perspective view of embodiments of the present invention arranged in a back-to-back configuration.

As exemplified by the alternative embodiment depicted in FIG. 8, display cases 102 may be configured in various sizes and shapes. Additionally, the display cases may incorporate attachment points 212 which are configured for supporting the weight of the display case and which may be utilized during the transport of the display case, such as by being adapted to receive the hook of a crane or forklift, for instance. Additionally, as depicted in FIG. 9, embodiments of the display case 102 may be adapted for arrangement in a back-to-back configuration so that merchandise may be displayed on all sides of the sales point.

Figure 10:
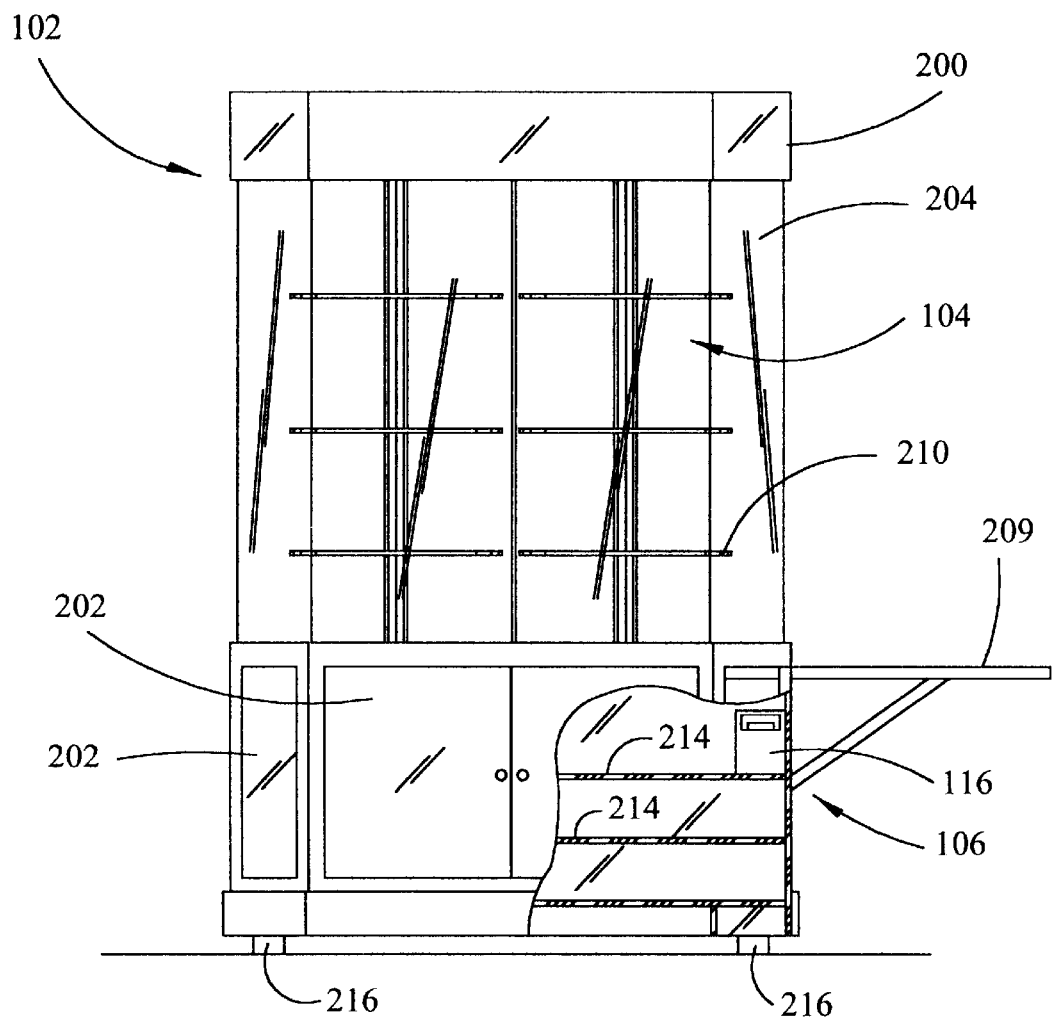
FIG. 10 is a partially cut-away, rear elevational view of a preferred embodiment of the present invention.
Figure 11:
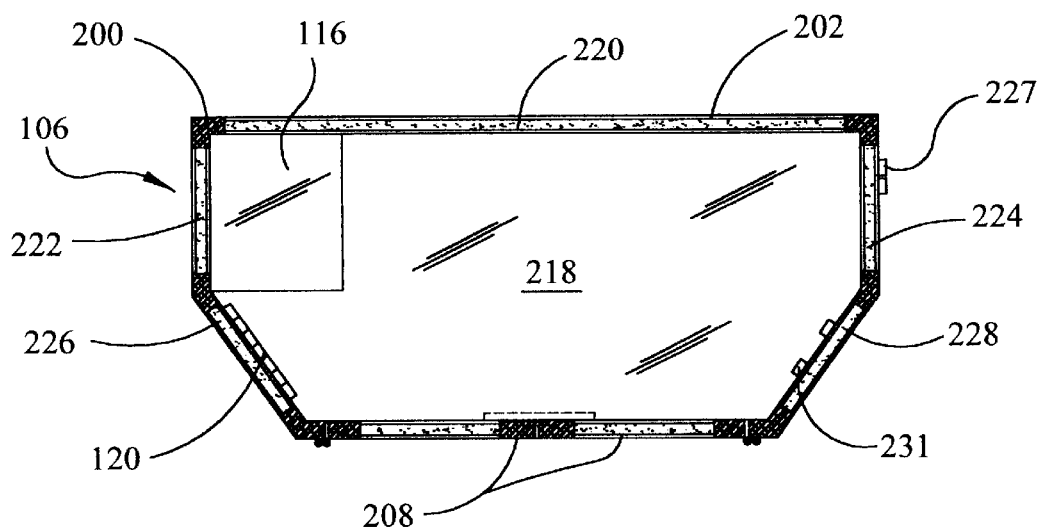
FIG. 11 is a partially cut-away, top view of a storage compartment of the present invention.

Referring now to FIGS. 10 and 11, various interior details of a representative display case 102 will be described. In particular, as shown in FIG. 10, storage compartment 106 may incorporate one or more shelves 214 to accommodate the storage of various items. Additionally, a plurality of wheels 216 which may be retractable in some embodiments, also may be provided for aiding in the transport and positioning of a display case 102.

Figure 12:
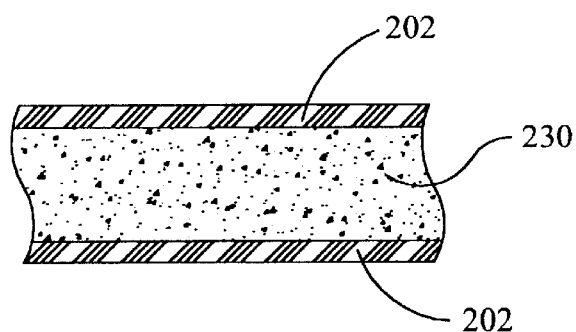
FIG. 12 is a partially cut-away, cross-sectional view showing detail of a panel section.

As shown in FIG. 11, storage compartment 106 preferably is configured with a generally rectangular shape, as viewed in cross-section, although various other configurations may be utilized and are considered well within the scope of the present invention. In the embodiment depicted in FIG. 11, the storage compartment 106 generally is formed by a bottom wall 218, back wall 220, side walls 222 and 224, wall portions 226 and 228 which are inclined inwardly toward each other, and armored doors 208. As described hereinbefore, the various walls and wall portions preferably are disposed between elements of the framework 200. As shown in greater detail in FIG. 12, each of the wall and wall portions preferably are formed in a "sandwich style" with first and second plates 202 that are spaced apart from each other with a material 230 being disposed between the plates. Preferably, plates 202 are formed of 1045 steel plates, with or without special treatment, with each plate preferably having a thickness of four to six millimeters.

In the various embodiments of the present invention, various materials 230 may be utilized for filling the space between plates 202 and can include materials such as pitch, which is advantageous in stopping sanders from being used for cutting through the plates, concrete and/or cement, which is extremely dense and may inhibit the use of drilling tools, and gun powder and/or other smoke-producing materials, which are useful in preventing the use of blow torches or other heating devices from cutting through the plates. Specifically, the use of gun powder and/or other colored smoke-producing materials is advantageous as such materials may produce a sufficient amount of flame to mark a thief with a special paint or soot which may be incorporated in some embodiments. A safe 116 also can be mounted within the storage compartment, as described hereinbefore.

Preferably the storage compartment 106 also provides accommodations for interconnection of various power and/or communications lines, such as through the use of a junction box 227. Routing of the various power and communications lines throughout the display case may be facilitated by the use of a control box 120, which serves as a switching assembly box for controlling the various switches and plugs 231 of the display case. Additionally, doors 208 may be provided with magnetic or electromagnetic fitting locks, described in detail hereinafter (shown in phantom lines).

Figure 13:
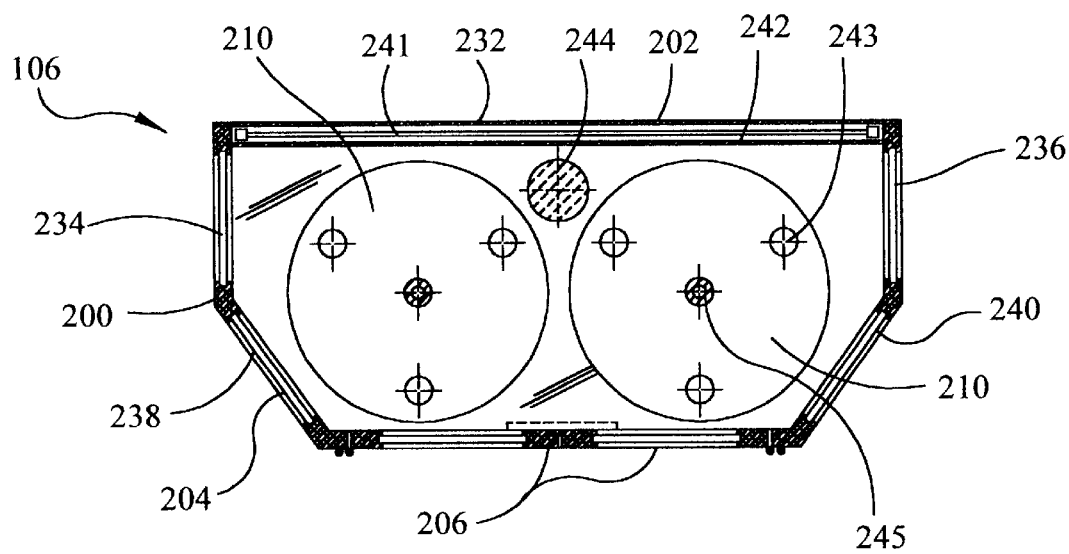
FIG. 13 is a partially cut-away, top view of a display compartment of the present invention.

Referring now to FIG. 13, display compartment 104 preferably incorporates a back wall 232 (which may be co-extensive with back wall 220 of the storage compartment), side walls 234 and 236, wall portions 238 and 240, and glass doors 206. Preferably, the framework of the display compartment receives plates of bullet-proof glass and/or polycarbonate 204 to form the wall portions and also the side walls, whereas the back wall 232 preferably is formed from steel plate 202. As described in relation to the various wall portions of the storage compartment, the wall portions of the display compartment also can be configured in a sandwich configuration incorporating material 230 between the plates 202.

The display case 102 also may incorporate lamps 241, such as fluorescent lamps, preferably along back wall 232 for lighting the display compartment 104. Preferably, the lamps 241 are covered by a sanded glass panel 242 which is adapted to scatter the light of the lamp, thereby providing efficient luminosity within the case. This lighting may be reinforced by dichroic lamps 243 which preferably are arranged on the ceiling of the display compartment and which are ventilated externally by a fan 244 which also preferably is disposed on the ceiling.

As depicted in the embodiment of FIG. 13, display platforms 210 may be mounted to cylindrical shafts 245 which are configured for rotating the platforms by means of a motor each (not-shown). So provided, customers viewing merchandise displayed on the platforms within the display case may be exposed to various views of the merchandise as the merchandise is rotated with the rotating platform. Additionally, the doors 206 of the display compartment also may incorporate magnetic fitting locks (shown in phantom lines), described in detail hereinafter.

As depicted in FIGS. 14 and 15, glass doors 206 and armored doors 208 preferably are provided with ledges 246 which extend beyond the side edges of the doors and which are adapted to engage jams 248 of the framework 200. Additionally, each of the doors preferably incorporates a protruding segment 250 which is adapted to be received within a recess 251 of its respective jam so that the doors are incapable of being removed, such as by disabling the hinges 254 and then attempting to remove the doors from the framework. Preferably, each of the doors is retained in a closed position by means of a magnetic lock 256 which, in some embodiments, may be configured with approximately 200 kilograms of retaining power. Lock 256 preferably is actuated by the second code entry device, as described hereinbefore.

As depicted in FIG. 16, armored doors 208 preferably incorporate one or more mechanical locking safety mechanisms 258, which, preferably, only are activated by means of break-ins. For instance, when a thief bores holes in the doors 208, a sheet of glass 259 contained inside the doors typically is broken, thereby releasing cord 260 which normally secures a safety pin 261 in its retracted position. Each mechanism then 258 urges pin 261 to its extended position (shown in phantom lines) so that the pins are engaged within corresponding orifices formed in the framework 200, thereby firmly securing the doors in their closed positions in the event of break-in.

Figure 17:
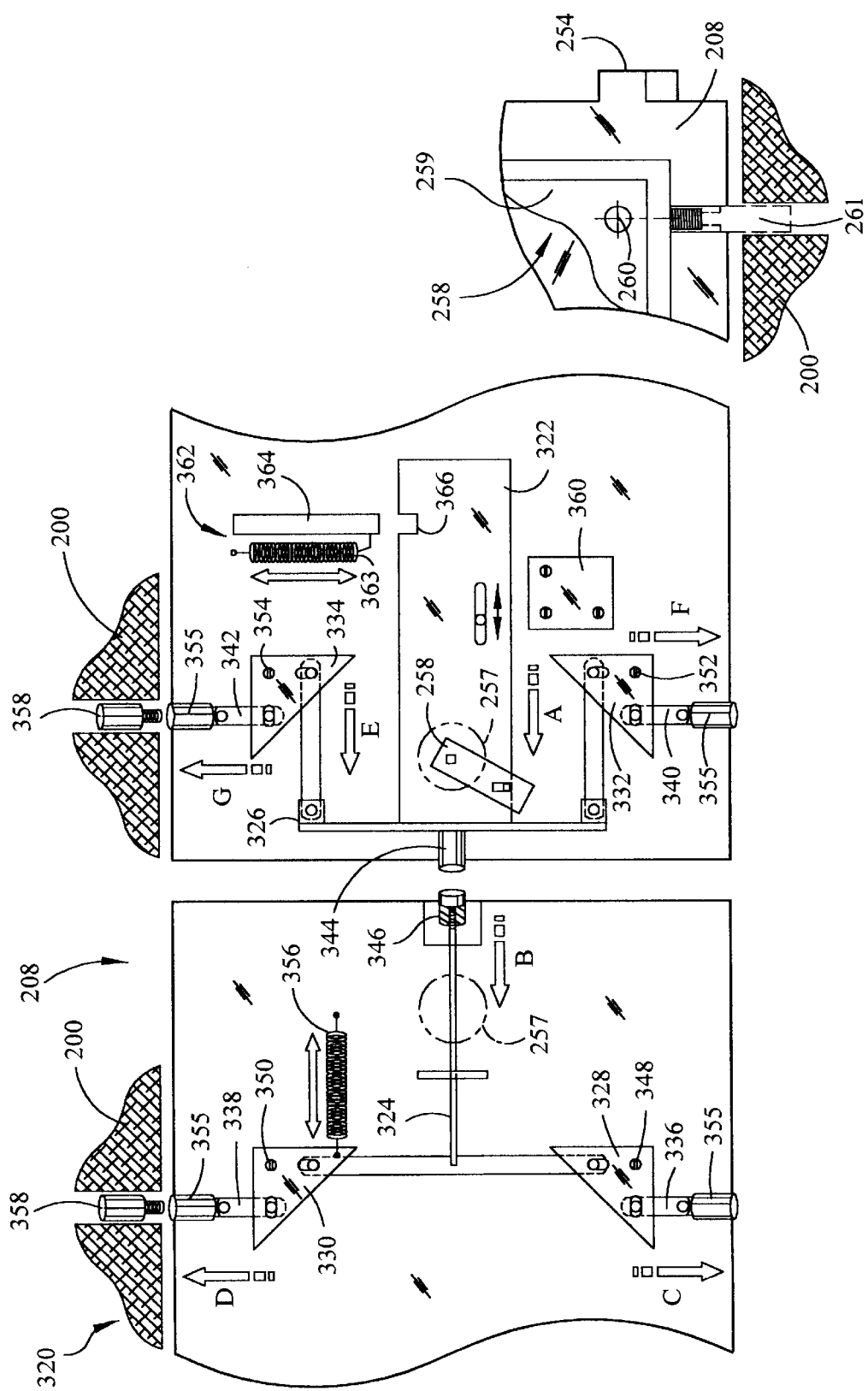

As shown in greater detail in FIG. 17, the doors also preferably include a locking mechanism 320. Locking mechanism 320 preferably incorporates a series of articulated members, including a block 322, preferably linked to the knob 257, via knob linkage 258, linkages 324 and 326, translational members 328, 330, 332 and 334, and transverse linkages 336, 338, 340 and 342. The various articulated members cooperate such that rotation of the knob 257 displaces the block 322, such as in the direction indicated by arrow A, from a retracted position to an extended position, where portion 344 of the block engages portion 346 of linkage 324. Such engagement urges the linkage 324, such as in the direction indicated by arrow B. Movement of linkage 324 causes rotation of the translation members 328 and 330 about respective pivots 348 and 350, and, in turn, urges the transverse linkages 336 and 338 outwardly, as indicated by arrows C and D, respectively. Movement of the transverse linkages urges the pins 260 outwardly, as described hereinbefore.

Movement of the block 322 in direction A also results in a movement of the linkage 326, as indicated by arrow E. Movement of the linkage 326 urges the translational members 332 and 334 to rotate about their respective pivots 352 and 354, thereby causing transverse linkages 340 and 342 to extend outwardly, as indicated by arrows F and G respectively. As described in relation to linkages 336 and 338, the linkages 340 and 342 urge respective pins 355 outwardly for engagement with the framework 200.

Preferably, the various articulated members of the locking mechanism are retained in their retracted position by means of biasing member 356, which can be a spring, for instance. Upon actuation of the knob 257, however, the biasing force of the member 356 is overcome so that the pins 355 are urged outwardly from the respective doors for locking the doors in their closed position. As each of the pins 355 are urged outwardly, preferably, retaining pins 358 are urged to a retracted position. In their extended positions, these pins 358 may be adapted to promote proper closing of the display doors (not shown in FIG. 17), and also locking of both the storage compartment and display compartment doors.

For facilitating locking of the block 322 in its extended or locked position, the locking mechanism 320 may incorporate an electromagnetic lock 360. The electromagnetic lock 360 may communicate with the various control systems of the display case, such as for facilitating unlocking of the storage compartment doors via commands transmitted by the first and second code entry devices, for instance. Additionally, locking mechanism 320 may incorporate a mechanical safety lock 362 which preferably incorporates the use of a biasing member 363 and a locking member 364, such as a steel rod, for instance, which is adapted to be urged by means of the biasing member into a recess 366 formed in the block 322 for mechanically retaining the block in its locked position, which preferably is activated only in the event of break-in. This system can work separately, or in conjunction, with that depicted in FIG. 16, such as when the sheet of glass 259 is broken.

Figure 18:
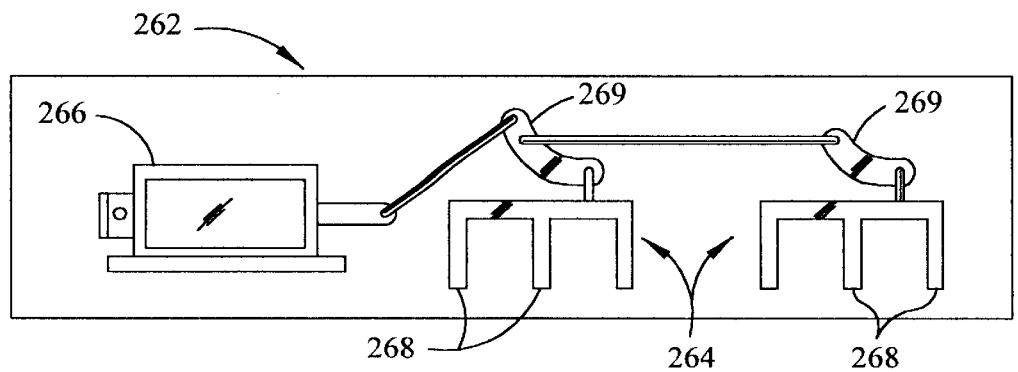
FIG. 18 is a side view of a locking mechanism of a preferred embodiment of the present invention.
Figure 19:
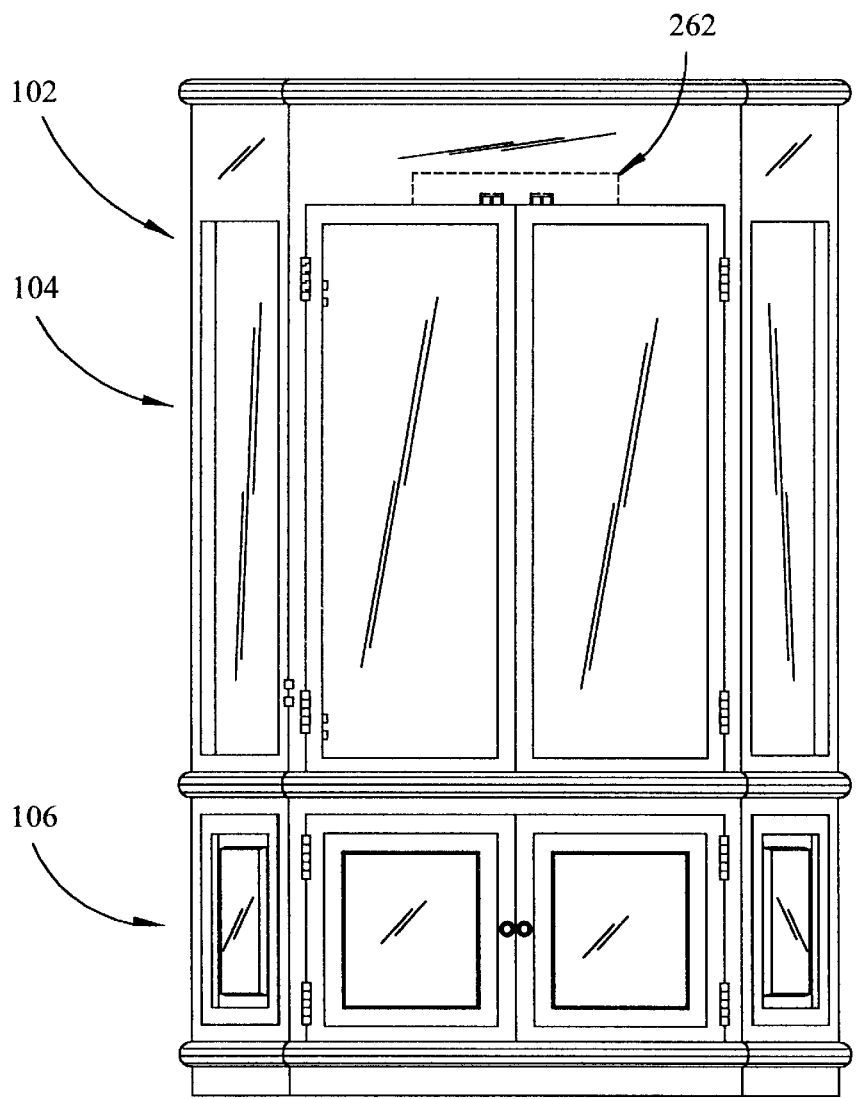
FIG. 19 is a front elevational view of a preferred embodiment of the present invention showing the preferred mounting location of the locking mechanism depicted in FIG. 18.

Referring now to FIG. 18, display compartment 104 also may incorporate a supplemental locking mechanism 262 which preferably incorporates the use of one or more solenoid-activated locking members 264. Each of the locking members 264 preferably are configured to be retained in an extended position by means of a solenoid 266. When actuated, the locking members may be urged upwardly from the extended position to a retracted position, where lock elements 268 disengage from corresponding orifices formed along an upper edge of the doors 206. Preferably, a pin with a spring (not shown) then expels the doors from their closed position, thereby not allowing the pins 268 to engage the orifices of the door 206. Preferably, movement of the locking members 264 is facilitated by pivot assemblies 269 which translate movement of the solenoid to the locking members. Such a locking mechanism 262 also may be actuated by the security system, as described hereinbefore, in relation to locking mechanism 259 of FIG. 17. Referring to FIG. 19, preferred placement of the assembly 262 is shown in phantom lines. This assembly preferably is activated by the first and/or second code entry device.

Figure 20:
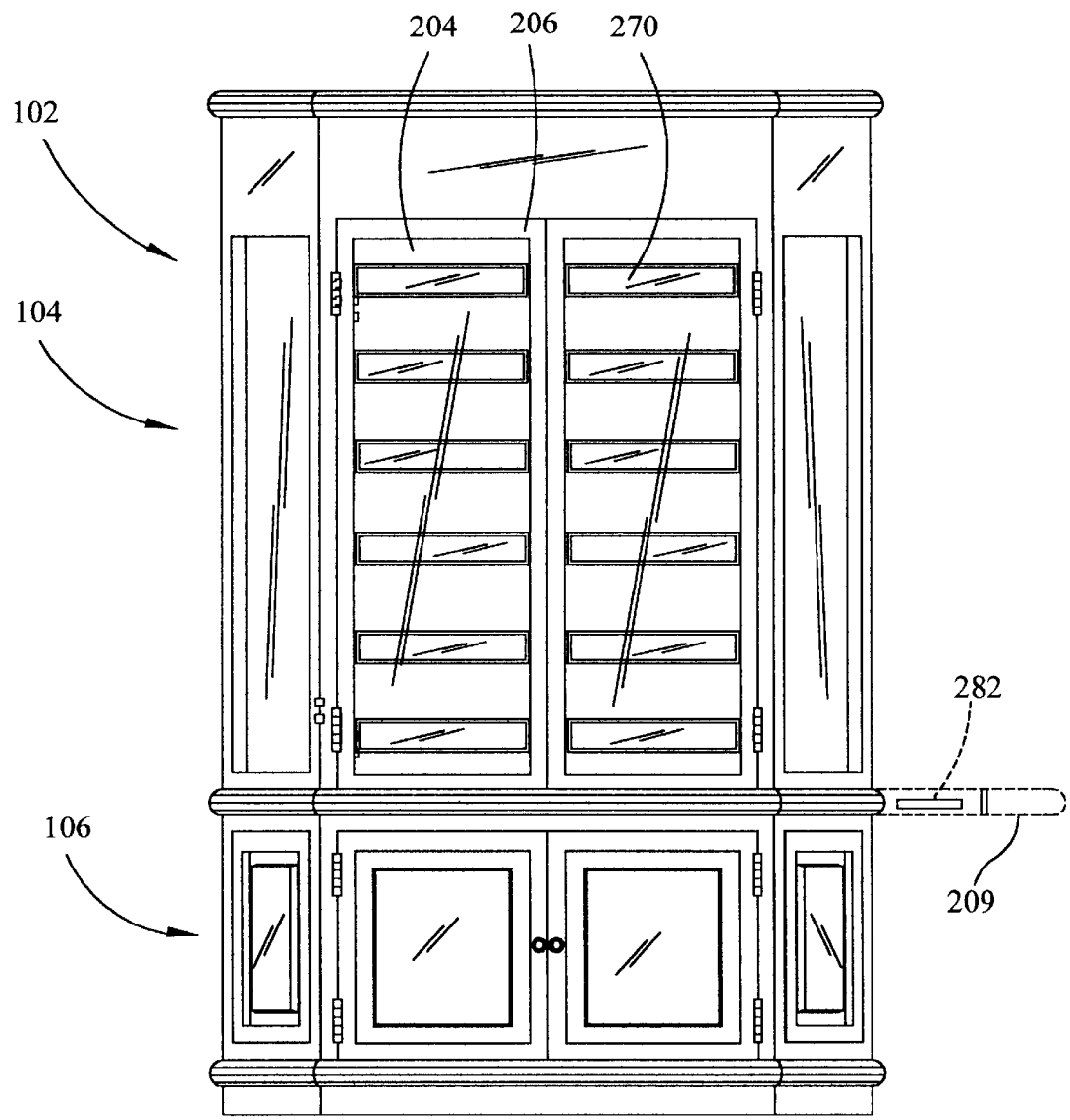
FIG. 20 is a front elevational view of an alternative embodiment of the present invention shown with the display compartment doors in a closed position.
Figure 21:
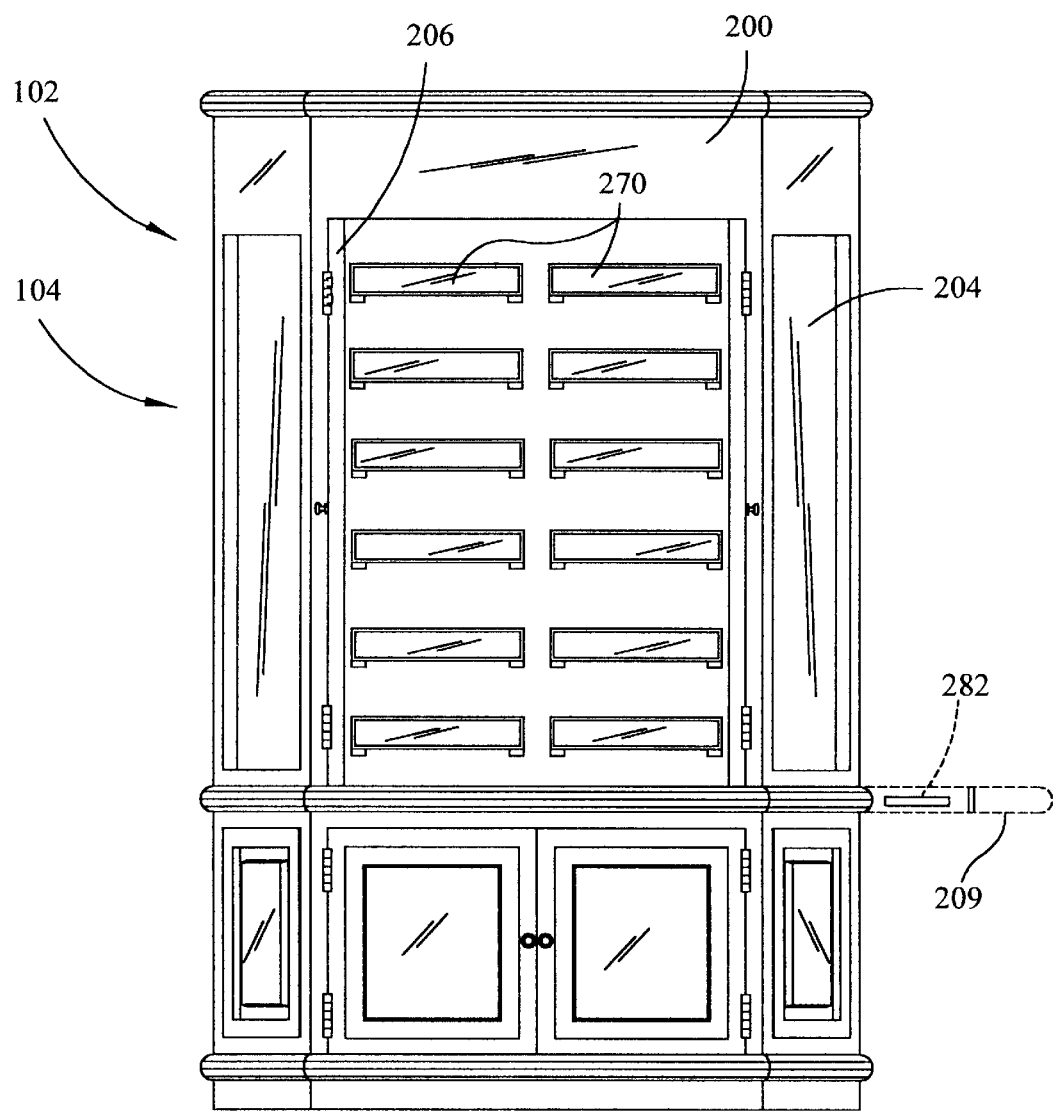
FIG. 21 is a front elevational view of a preferred embodiment of the present invention shown with the display compartment doors in an open position.
Figure 22:
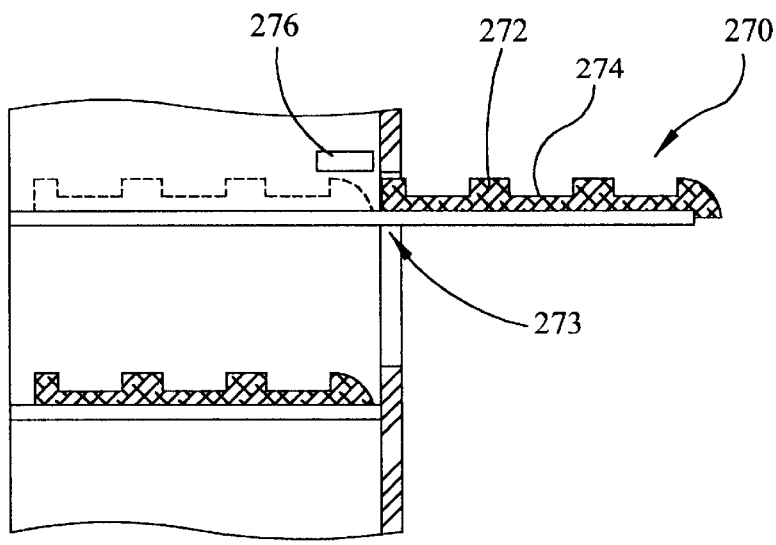
FIG. 22 is a partially cut-away, side cross-sectional view showing detail of a merchandise drawer.
Figure 23:
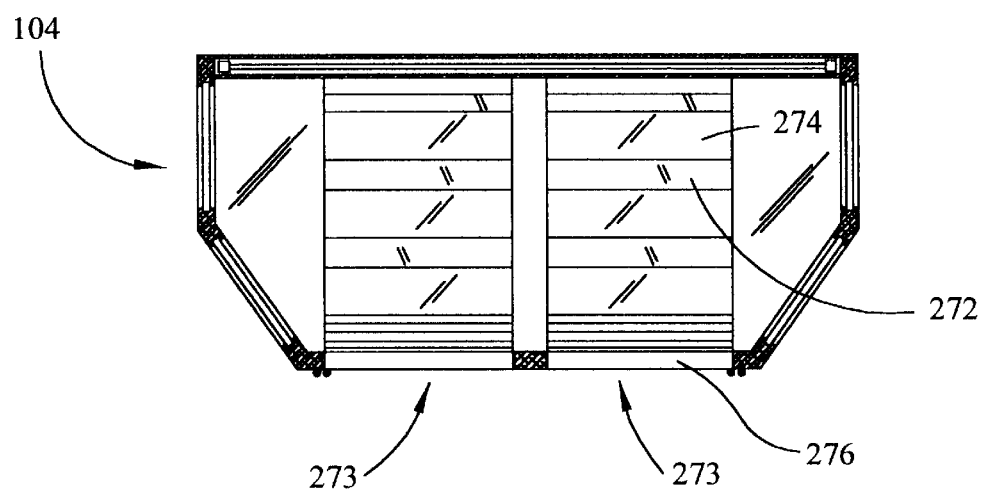
FIG. 23 is a cross-sectional top view of an alternative embodiment of the present invention, incorporating merchandise drawers.

Referring now to FIGS. 20–25, an alternative embodiment of the present invention will be described. The embodiments depicted in FIGS. 20–25 incorporate the use of display trays 270 which preferably are electronically controlled for movement between retracted and extended positions. Preferably, the trays 270 are controlled such that they only are movable by commands which are entered on the notebook or by remote control. As shown in FIG. 20, when glass doors 206 are in their closed position, access to merchandise displayed upon the trays 270 is prevented. However, as depicted in FIG. 21, when the doors 206 are in their open position, the trays may be individually moved to their extended positions (depicted in FIG. 22). As shown in FIGS. 22 and 23, each of the trays 270 may incorporate an alternating series of ridges 272 and recesses 274 which define a series of display areas on each of the trays.

The embodiment of FIG. 23 depicts an alternative tray configuration. Specifically, each of the trays 270 are adapted to cooperate with the display compartment doors so that each of the trays may be individually extended through and beyond the front plane of the doors when the doors are in their closed positions. Preferably, this is facilitated by each of the doors having slots 273 formed therethrough with each of the slots being aligned with one of the trays 270, or some other mechanism which can select the trays. Along the front edge of each tray, a door or window segment 276 preferably is provided which cooperates with its corresponding slot to provide a secure enclosure for the merchandise stored and displayed upon its tray. So configured, when a tray is to be moved to its extended position, the window segment disengages from the slot, such as by sliding upward and into the display case 276, thereby allowing merchandise placed upon the tray to be removed. Then, when the tray is moved back to its retracted position, the window segment once again engages within the slot, thereby sealing the display compartment.

Figure 24:
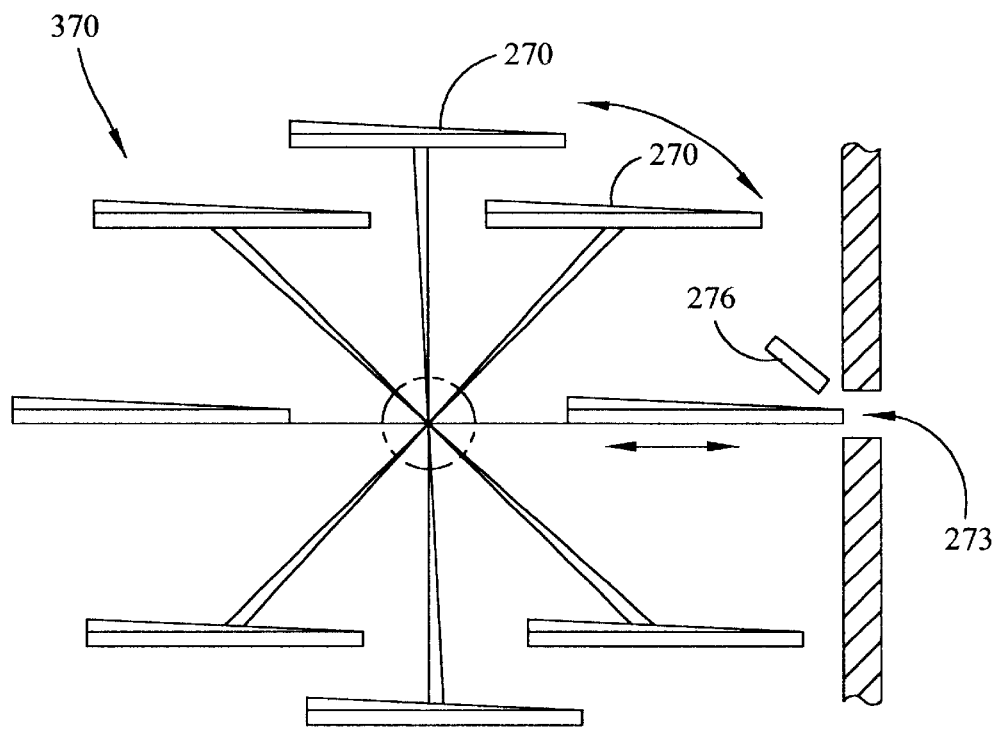
FIG. 24 is a partially cut-away, side view of an alternative embodiment of a merchandise display unit.

As shown in FIG. 24, an alternative embodiment may incorporate a carousel apparatus 370 which is adapted to rotate about an axis so that various trays 270 may be presented in alignment with a slot 273 formed in the display case. Once so aligned, the shelf 270 may be extended at least partially through the slot 273 so that merchandise positioned upon the tray 270 may be removed or viewed in such place.

Figure 25:
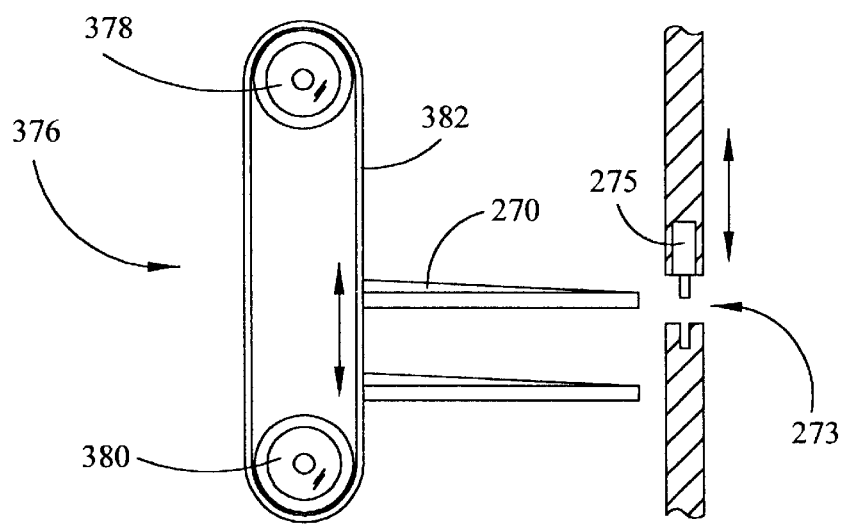
FIG. 25 is a partially cut-away, side view of an alternative embodiment of a merchandise display unit.

As depicted in FIG. 25, an elevator-type apparatus 376 may be provided for selectively aligning various shelves 270 with the opening 273. In the embodiment depicted in FIG. 25, the elevator-apparatus incorporates the use of opposing pulleys 378 and 380 which cooperate with a belt 382 so that the trays 270 may be aligned with the slot 273. Unlike the member 276 which is adapted to close slot 273 depicted in FIG. 24, the member 275 depicted in FIG. 25 is adapted to be received within a recess of the display case, other various embodiments, however, may be utilized.

Figure 27:
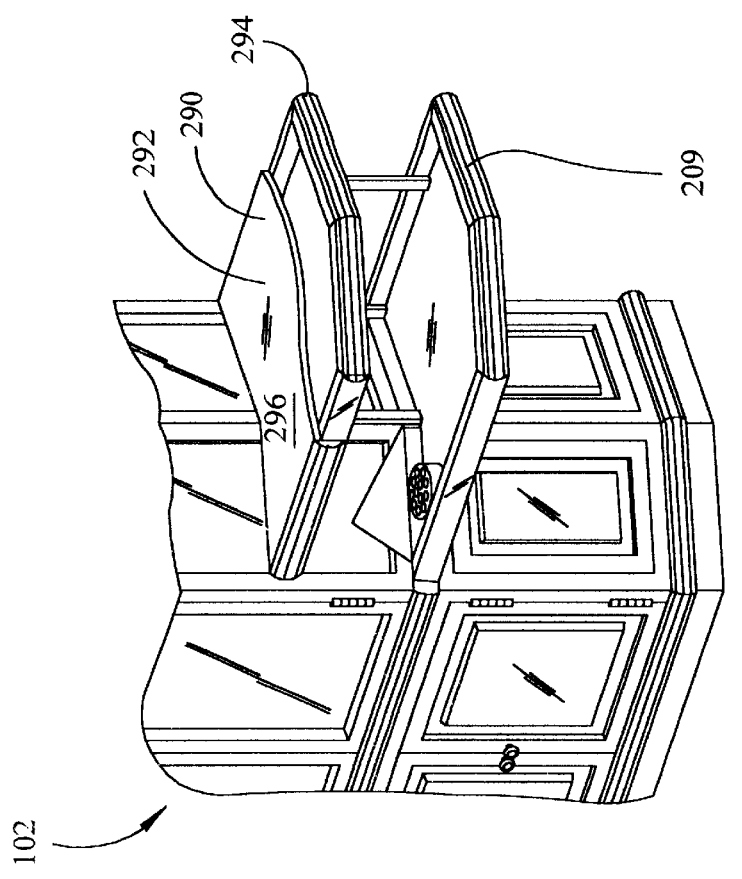
FIG. 27 is a partially cut-away, perspective view of an alternative embodiment of the present invention showing detail of a cash drawer.
Figure 26:
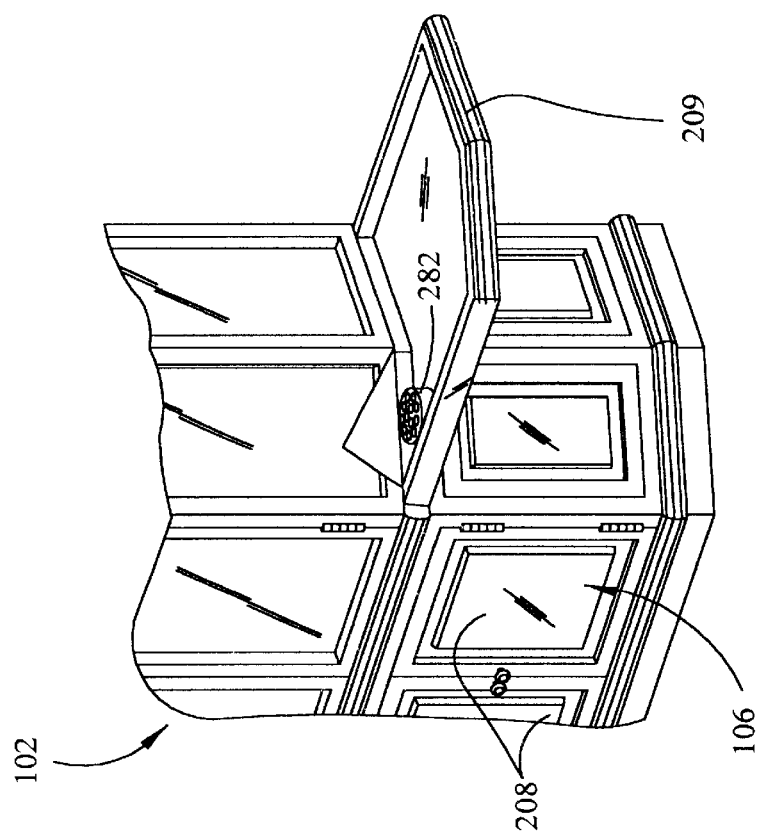
FIG. 26 is a partially cut-away, perspective view of an alternative embodiment of the present invention showing detail of a support shelf and keypad.

Referring now to FIGS. 26 and 27, preferred embodiments of the display case incorporate a retractable shelf 209 which preferably is electronically controlled to move to its extended position in response to a signal received from the remote 130 (FIG. 3), described hereinbefore. As shown in greater detail in FIG. 26, shelf 209 preferably is configured to house the first code entry device 282, also described hereinbefore. Such a code entry device may be utilized for providing access to the storage compartment 106 by unlocking the armored doors 208 in response to a properly keyed in password. As depicted in FIG. 27, shelf 209 also may function as a mounting platform for supporting a cash box 290. Cash box 290 preferably includes an exterior housing 292 and a retractable drawer 294 mounted thereto with the cash drawer moving between its open and closed position in response to commands which preferably are communicated by the notebook. Housing 292 also provides a suitable upper surface 296 which is adapted for the placement of the notebook thereon.

Figure 28:
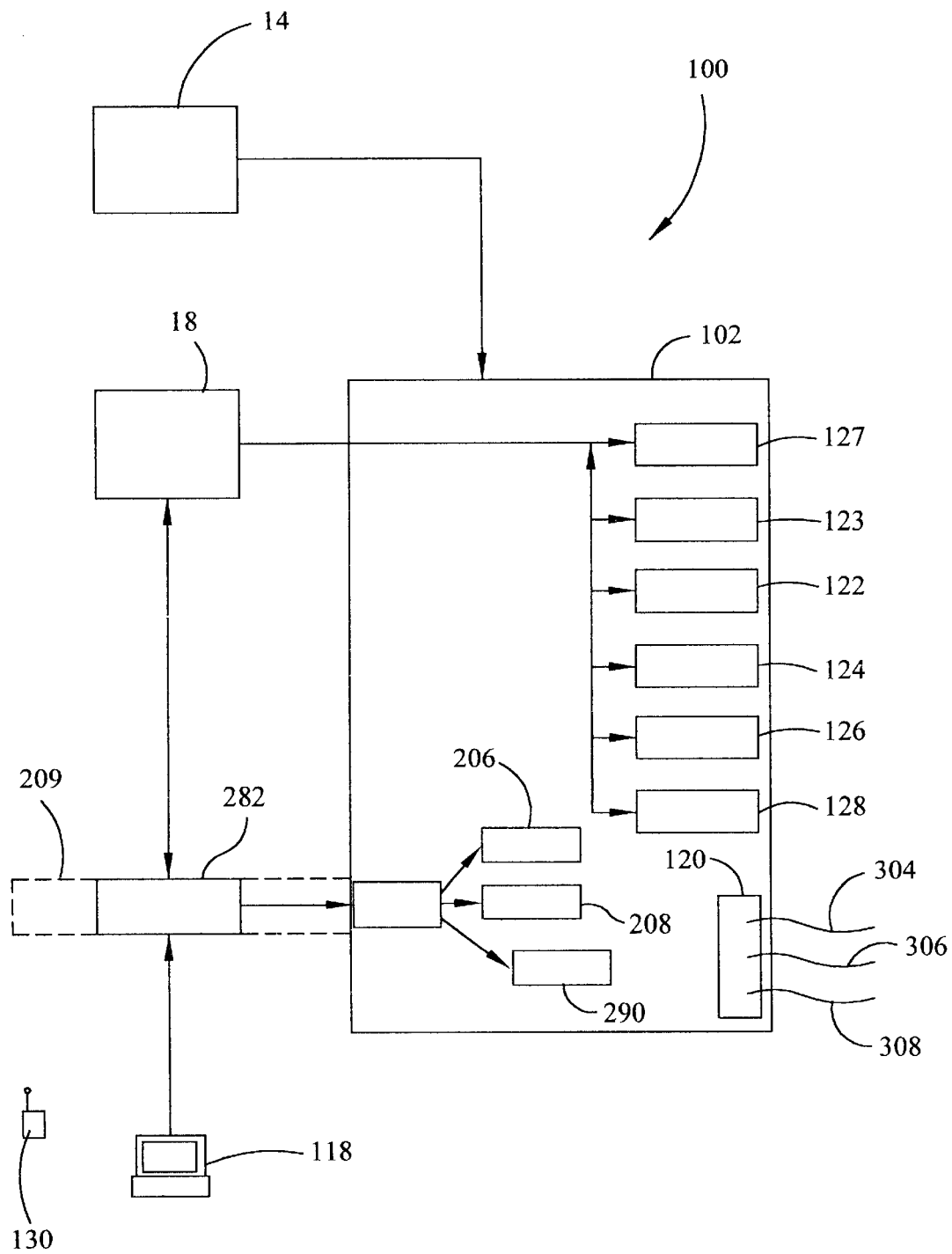
FIG. 28 is a schematic diagram depicting system integration of a preferred embodiment of the present invention.

Referring now to FIGS. 28 and 3, a preferred embodiment of the security and monitoring system of the present invention will be described in detail. As described briefly hereinbefore, each sales point unit 100 preferably intercommunicates with a control center which is established to monitor the sales points. To facilitate such monitoring, each sales point unit preferably incorporates a variety of apparatus. Such apparatus may include, for example, a video camera monitoring system 127 which may be configured to be monitored via the internet or a standard telephone line, such as line 304. Such video camera monitoring system may be utilized in order to allow the control center to answer various questions posited by an operator/agent at the sales point, to identity of a user attempting to access the display case, etc. One or more smoke sensors 123, magnetic or vibration sensors 122, and a remote panic button 124 also may be monitored for possible danger situations including fire, robberies, and attempted break-ins. The magnetic and/or vibration sensors, of which there may be several of each, preferably are intelligent sensors that distinguish, such as through memorization, that an attempted break-in is taking place, as opposed to a simple bump or knock. For instance, the sensors may be linked to a memory device which may be programmed to compile information collected by the various sensors throughout the normal work cycle, with variations from the sensations of the normal work cycle preferably prompting a security response. Such response may include an alert for focusing the attention of security personnel on the display case experiencing abnormal sensor indications. If a situation requiring the activation of the security response is necessitated, a voice recording module 126 also may be provided for providing an audible warning, such as a warning which would indicate that the sales point is being broken into and that security personnel have been contacted. Such a warning also may be accompanied by the sound of a siren, for instance. This voice recording module 126 is programmed with warnings such as: "This sales point is being broken into. The police have already been contacted." Through this system, a thief may be discouraged from continuing to damage the sales point.

Preferably, the security system also incorporates a powerful no-break power supply which is adapted to allow the alarm and the notebook to continue to function after a normal supply has been interrupted. Therefore, in the event the supply of electrical power line(s) 306 and/or the telephone line(s) 304 and/or 308 are cut, a security response immediately may be actuated. Additionally, disconnection of a phone line also may prevent the opening of the doors of the display case, i.e., doors 206 and 208, even when a correct password has been properly utilized for opening the doors.

Separate emergency telephone line(s) 308 also may be provided which facilitates the use of a remote panic button 124, which may be integrated with the remote access device 130. Such buttons may be adapted for hanging around the neck of an agent or may be adapted to fasten to his or her clothing so that the device is readily available for actuation. Upon actuation, an emergency signal preferably is transmitted through the emergency line to the security center in the control center.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

What is claimed is:

1. A business method for the display and sale of merchandise comprising:

providing a sales point comprising a display case including a storage compartment, the sales point being configured to display merchandise, the sales point having alarms associated therewith;

remotely monitoring the sales point for use by an authorized agent;

remotely monitoring transactions occurring at the sales point;

remotely monitoring the alarms of the sales point; and wherein the display case has a first code entry device and is configured to selectively provide access to the storage compartment in response to the authorized agent entering an access code into the first code entry device within a defined time period, wherein the first code entry device configured to allow the door of the storage compartment to be moved to an open position, a second code entry device configured to allow the door of the display compartment to be moved to the open position, the second code entry device being adapted to be stored within the storage compartment when the door of the storage compartment is in its closed position such that access to the second code entry device is denied until a valid code is entered.

2. The business method claim 1, wherein the step of remotely monitoring transactions includes the step of receiving a transaction report from the sales point, the transaction report including information regarding merchandise sold at the sales point.

3. The business method of claim 1, wherein the step of remotely monitoring transactions includes the steps of updating an inventory of merchandise contained at the sales point and transporting additional merchandise to the sales point based upon the inventory.

4. The business method of claim 1, further comprising the step of remotely providing assistance to the authorized agent of the sales point.

5. The business method of claim 1, wherein the display case further includes a display compartment, the display compartment being configured to display merchandise therein.

6. A sales point unit for use in displaying and storing merchandise comprising:

a display case having a display compartment and a storage compartment, the display compartment being defined by a framework and bullet-proof glass panels disposed between portions of the framework, the storage compartment being defined by the framework and rigid panels of metal disposed between portions of the framework, the display compartment having an interior and a door for providing access thereto when in an open position, the storage compartment having an interior and a door for providing access thereto when in an open position; and a security system cooperating with the display case, the security system having a first code entry device and a second code entry device, the first code entry device configured to allow the door of the storage compartment to be moved to the open position, the second code entry device configured to allow the door of the display compartment to be moved to the open position, the second code entry device being adapted to be stored within the storage compartment when the door of the storage compartment is in its closed position such that access to the second code entry device is denied until a valid code is entered into the first code entry device and the door of the storage compartment is moved to the open position.

7. The sales point unit of claim 6, wherein the sales point unit has a remote access device which is configured to provide access to the first code entry device.

8. The sales point unit of claim 6, wherein the security system includes a smoke detector, a video monitoring system, and a vibration sensor.

9. The sales point unit of claim 6, wherein the rigid panels of the storage compartment are formed in a sandwiched configuration, with each of the panels being formed from first and second steel sheets which are spaced from each other with filling material disposed therebetween, the filling material being formed of at least one of the group consisting of: cement, concrete, polycarbonate, pitch, and gun powder.

10. The sales point unit of claim 6, wherein the display compartment has a plurality of trays, each of the trays being movable between a retracted position and an extended position, in the extended position, the trays being configured to extend beyond a plane of the door of the display compartment such that merchandise is removable from the trays, each of the trays being separately controllable to move between its retracted and extended position by use of the second code entry device.

11. The sales point unit of claim 6, wherein the first code entry device is configured only to provide access to the exterior of the storage compartment during a defined time period, and wherein the security system includes a video monitoring system which is configured to identify an agent attempting to access the interior of the storage compartment by use of the first code entry device.

12. A sales point unit for use in displaying and storing merchandise comprising:

means for securely storing and displaying merchandise;

means for providing access to the merchandise stored and displayed within the sales point unit;

means for remotely monitoring transactions occurring at the sales point unit; and wherein the means for securely storing and displaying merchandise includes a shelf movable between a retracted position and an extended position such that, when in the extended position, the shelf provides access to a first code entry device, wherein the first code entry device configured to allow the door of the storage compartment to be moved to an open position, a second code entry device configured to allow the door of the display compartment to be moved to the open position, the second code entry device being adapted to be stored within the storage compartment when the door of the storage compartment is in its closed position such that access to the second code entry device is denied until a valid code is entered.

13. The sales point unit of claim 12, wherein the means for providing access to the merchandise includes a first code entry device, and wherein the sales point unlit has means for providing access to the first code entry device.

14. The sales point unit of claim 13, wherein the means for providing access to the first code entry device includes a remote access device.

15. A computer readable medium having a computer program for operating a sales point unit having merchandise associated therewith, the computer readable medium comprising:

a first code segment which provides access to the merchandise stored and displayed within the sales point unit;

a second code segment which provides monitoring of transactions occurring at the sales point unit; and wherein the first code segment is configured to selectively provide authorized access to the merchandise in response to receiving an access code, wherein the first code segment is configured to allow a door of a storage compartment to be moved to an open position, a second code segment configured to allow the door of a display compartment to be moved to the open position, the second code segment being adapted to be stored within the storage compartment when the door of the storage compartment is in its closed position such that access to the second code segment is denied until a valid code is entered.

16. The computer readable medium of claim 15, wherein the first code segment is further configured to selectively provide access to the merchandise in response to receiving the access code within a defined time period.

* * * * *